(12) United States Patent
Castillo

(10) Patent No.: US 11,436,913 B2
(45) Date of Patent: Sep. 6, 2022

(54) SEPTIC TANK FAILURE POSSIBILITY DETECTION AND ALERT SYSTEM AND METHOD

(71) Applicant: Salvador Casillas Castillo, Salinas, CA (US)

(72) Inventor: Salvador Casillas Castillo, Salinas, CA (US)

( * ) Notice: Subject to any disclaimer, the term of this patent is extended or adjusted under 35 U.S.C. 154(b) by 0 days.

(21) Appl. No.: 17/120,227

(22) Filed: Dec. 13, 2020

(65) Prior Publication Data

US 2021/0183233 A1 Jun. 17, 2021

Related U.S. Application Data

(60) Provisional application No. 62/948,137, filed on Dec. 13, 2019.

(51) Int. Cl.
*G08B 19/00* (2006.01)
*G08B 31/00* (2006.01)
(Continued)

(52) U.S. Cl.
CPC ............ *G08B 31/00* (2013.01); *G01F 23/30* (2013.01); *G01F 23/802* (2022.01);
(Continued)

(58) Field of Classification Search
CPC . E03F 7/00; E03F 2201/40; E03F 7/04; E03F 9/00; E03F 1/001; E03F 5/107; G01F 23/58; G01F 23/603; G01F 23/0007; G01F 23/164; G01F 23/18; G01F 23/185; G01F 23/62; G01F 23/0069; G01F 23/30; G08B 21/182; G08B 25/08; G08B 29/181; G08B 31/00; B01D 35/02; B01D 35/027; B01D 35/147; B01D 17/0205; B01D 17/0208; B01D 17/044; B01D 17/047; B01D 19/0047; B01D 21/10; B01D 21/2416; B01D 21/2433; E21B 21/067; E21B 43/18; E21B 43/20; F23G 7/085; C10G 1/047; C10G 33/06; E03B 7/071; F16K 15/1848; F16K 27/065; F16K 31/602; F16K 5/0407; F16K 5/0414; F16K 43/00; Y02A 20/15; Y02A 30/277; Y10T 137/0324; Y10T 137/6058; Y10T 137/6991;
(Continued)

(56) References Cited

U.S. PATENT DOCUMENTS 9,963,868 B2 * 5/2018 Gutu .................... E03F 7/00
2008/0057942 A1 * 3/2008 Woods .................... H04L 67/18
455/425

(Continued)

*Primary Examiner* — Daniel Previl
(74) *Attorney, Agent, or Firm* — Patrick Reilly

(57) ABSTRACT

A septic system level detection system includes a means to detect a fluid level within a septic system that indicates a failure or possible impending failure of a septic system and means to communicate an alert of this indication via electronic messaging media. A digitized record of information related to the identified septic system is stored in a database. Upon receipt of a septic system failure alert, at least a portion of the digitized record of information is transmitted via an electronic communications system network, i.e., a network comprising a telephony network and/or the Internet, to a predesignated address of the network.

22 Claims, 20 Drawing Sheets

(51) Int. Cl.
*G01F 23/30* (2006.01)
*G08B 21/18* (2006.01)
*H04L 67/12* (2022.01)
*G08B 29/18* (2006.01)
*G01F 23/80* (2022.01)
*G06Q 10/00* (2012.01)

(52) U.S. Cl.
CPC ......... *G08B 21/182* (2013.01); *G08B 29/181* (2013.01); *H04L 67/12* (2013.01); *G06Q 10/20* (2013.01)

(58) Field of Classification Search
CPC ........... Y10T 137/7287; Y10T 137/742; Y10T 137/8342; Y10T 137/86381; Y10T 137/4273; Y10T 137/4336; Y10T 137/6086; Y10T 137/6969; Y10T 137/7903; Y10T 137/877; A01C 15/008; A01D 2101/00; A01D 43/14; A01K 5/0216; A01K 7/02; A01M 21/043; A01M 7/0092; B08B 9/08; B60P 1/60; B60P 3/224; C02F 1/34; C02F 1/40; C02F 2101/32; C02F 2103/001; C02F 2209/005; C02F 3/006; C02F 3/1242; E03C 1/232; E03C 1/262; E03C 1/284; E03C 1/30; E03C 1/304; F02B 3/06; F02M 19/03; F02M 1/00; F02M 2700/4373; F02M 2700/4397; F02M 69/00; F02M 7/23; F17D 1/08; F22B 37/42; F23C 2700/023; F23C 99/00; F25B 17/00; G06Q 10/20; H01L 35/00; H04L 67/12; Y02B 30/62; Y02P 60/21; Y02W 10/10; Y02W 10/15; Y10S 4/07
USPC ..... 340/519, 507, 506, 514, 539.13, 539.22, 340/538.15, 539.3, 568.1, 573.4, 693.1, 340/693.2

See application file for complete search history.

(56) References Cited

U.S. PATENT DOCUMENTS

| | | | |
|---|---|---|---|
| 2013/0306572 A1* | 11/2013 | Potts | E03F 1/006 210/747.9 |
| 2015/0127137 A1* | 5/2015 | Brandt | B23K 26/20 700/166 |
| 2016/0187894 A1* | 6/2016 | Malky | F24D 19/1009 700/276 |
| 2017/0306608 A1* | 10/2017 | Goldberg | G01F 23/164 |
| 2018/0291911 A1* | 10/2018 | Ward | F04F 5/10 |
| 2019/0114898 A1* | 4/2019 | Wanie | G08B 25/10 |
| 2019/0281371 A1* | 9/2019 | Klicpera | G01M 3/3254 |

* cited by examiner

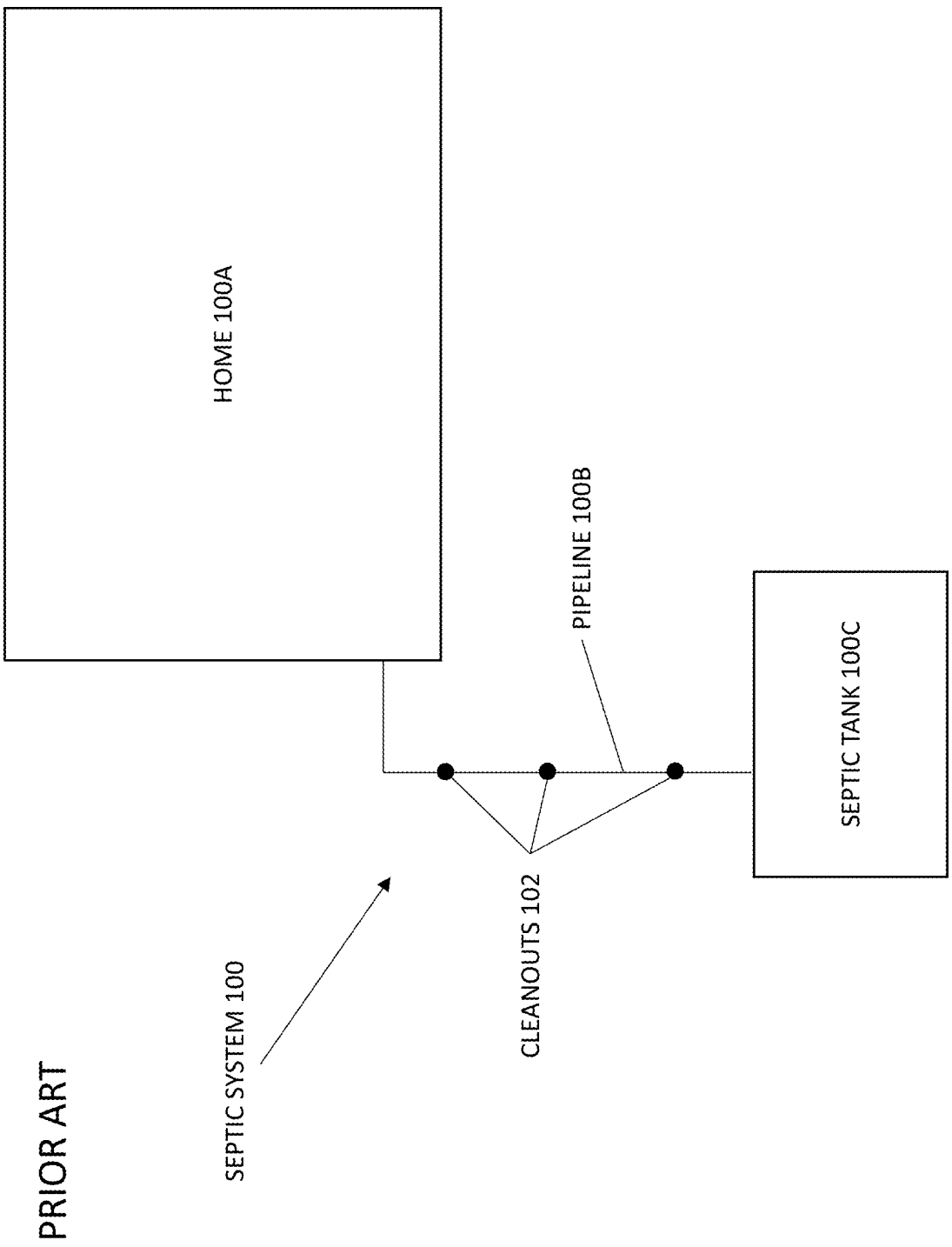

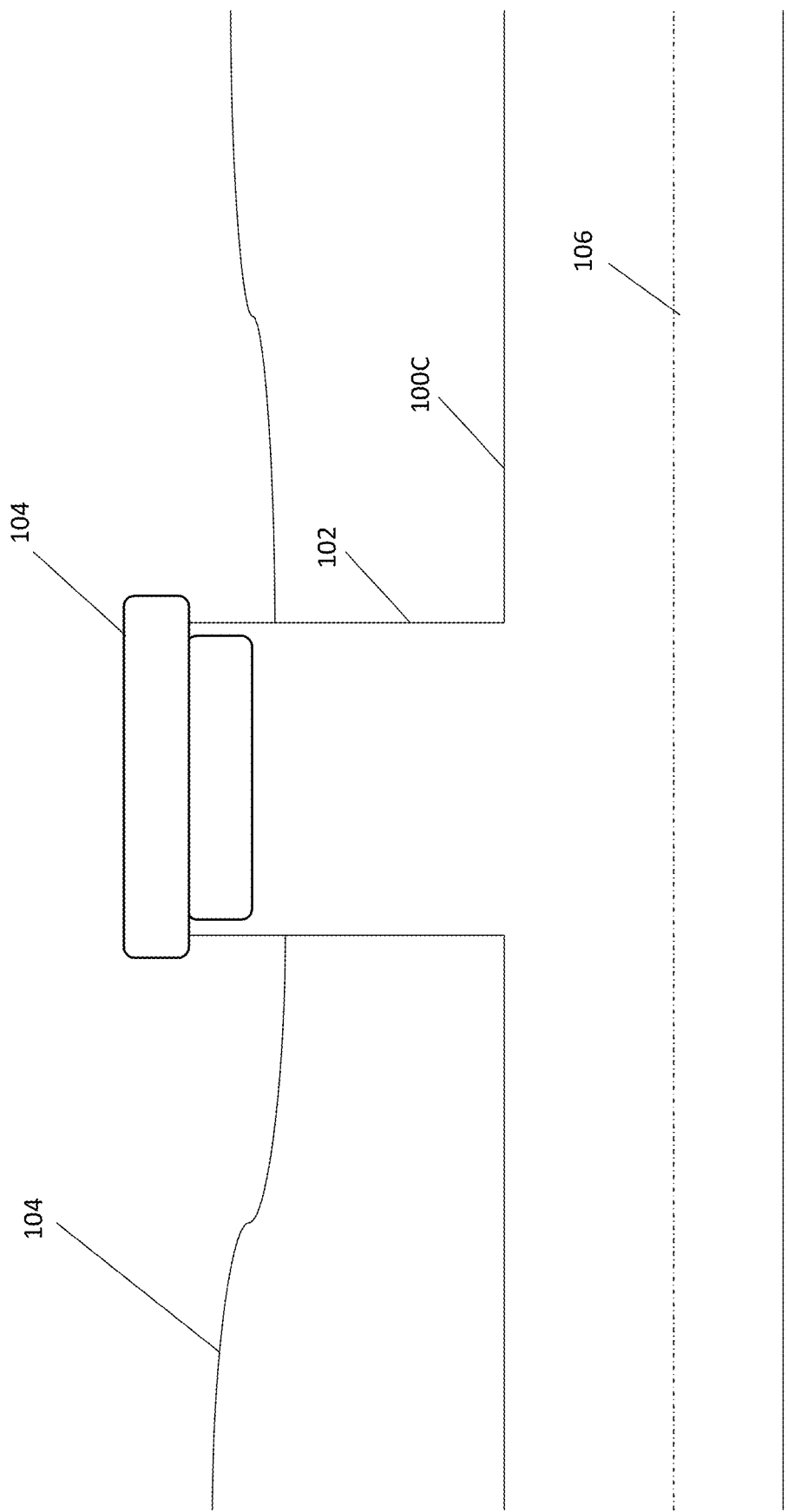

|   | A | B | C | D | E | F |
|---|---|---|---|---|---|---|
| 0 | REC ID | ALERT | RESPONSE ADDR | CONTACT PHONE | CUSTOMER NAME | LAST SERVICE |
| 1 | 001 | 0 | 8352 Mechanic Ave. Jackson, TX 77566 | 202-555-0141 | Lorem Ipsum | 12/2/2019 |
| 2 | 002 | 0 | 8352 Mechanic Ave. Jackson, TX 77566 | 202-555-0141 | Lorem Ipsum | 12/2/2019 |
| 3 | 003 | 0 | 8352 Mechanic Ave. Jackson, TX 77566 | 202-555-0141 | Lorem Ipsum | 12/2/2019 |
| 4 | 004 | 0 | 912 St Paul St. New Kens, PA 15068 | 202-555-0194 | Abu Hastings | 3/12/2017 |
| 5 | 005 | 1 | 6 Wrangler Lane Midland, MI 48640 | 202-555-0158 | Avira Scott | 9/19/2018 |
| 6 | 006 | 2 | 870 Old York Street Riverview, FL 33569 | 202-555-0151 | Malcolm Mack | 1/17/2016 |
| 7 | 007 | 0 | 693 Chapel Ave. Ambler, PA 19002 | 555-6466-728 | Lillian Kelly | 7/4/2018 |
| 8 | 008 | 1 | 8986 Club St #A Santa Clara, CA 95050 | 555-9962-552 | Emaan Mcdermott | 1/19/2019 |
| 9 | 009 | 0 | 8986 Club St #B Santa Clara, CA 95050 | 555-9962-552 | Emily Meyer |  |
| 10 | ... | ... | ... | ... | ... | ... |
| 11 | N | 0 | 101 Cooper St, Santa Cruz, CA 05060 | 555-4446-355 | Sid Amet | 12/13/2019 |

FIGURE 5

| | | |
|---|---|---|
| ID | 001 1602A | SCHEDULE MAINTENANCE 1604A |
| CURRENT ALERT LEVEL | 0 1602B | |
| LAST ALERT | 12/1/2019 1602C | NOTIFY PUMPER 1604B |
| DEVICE TYPE | 1.0 1602D | |
| LAST SERVICE | 12/2/2019 1602E | NOTIFY PLUMBER 1604C |
| CONNECTED DEVICES | 002, 003 1602F | |
| LOCATION | 8352 Mechanic Ave. Jackson, TX 77566 1602G | TRANSMIT RECORD 1604D |
| HOMEOWNER | Lorem Ipsum 202-555-0141 1602H | |
| PREFERRED PUMPER | Happy Septic 202-555-0414 1602I | UPDATE WEB RECORD 1604E |
| PREFERRED PLUMBER | Sid Amet dolorsidamet@gmail.com 1602J | MANUALLY EDIT INFORMATION 1604F |
| CERTIFICATION | ☒ Jackson, TX building code ☒ Texas building code 1602K | |
| SERVICE HISTORY | Installed 4/22/1990 Pumped 6/23/1993 ..... 1602L | RESET DEVICE 1604G |
| NOTES | Cleanout located behind garden shed 1602M | |

FIGURE 16

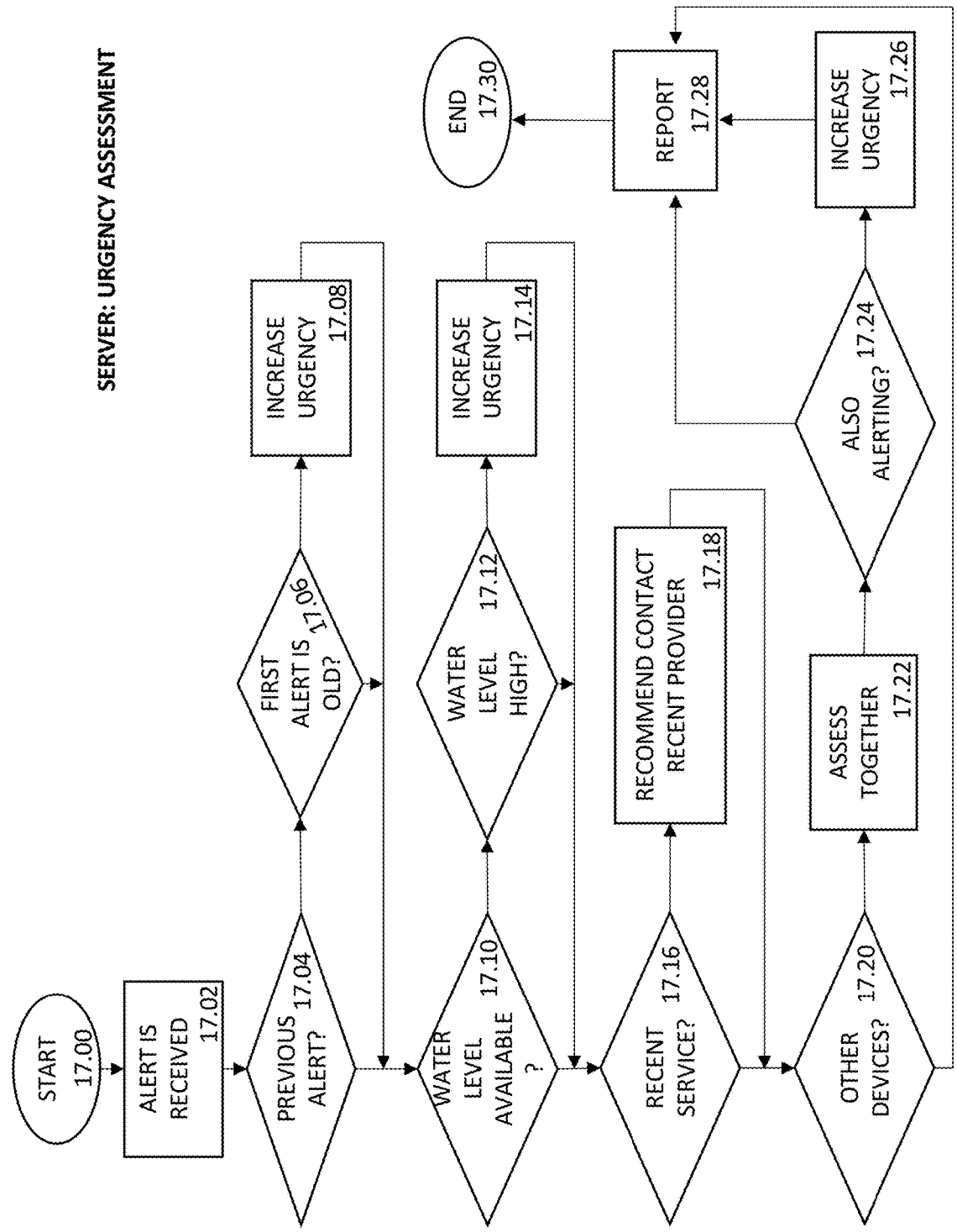

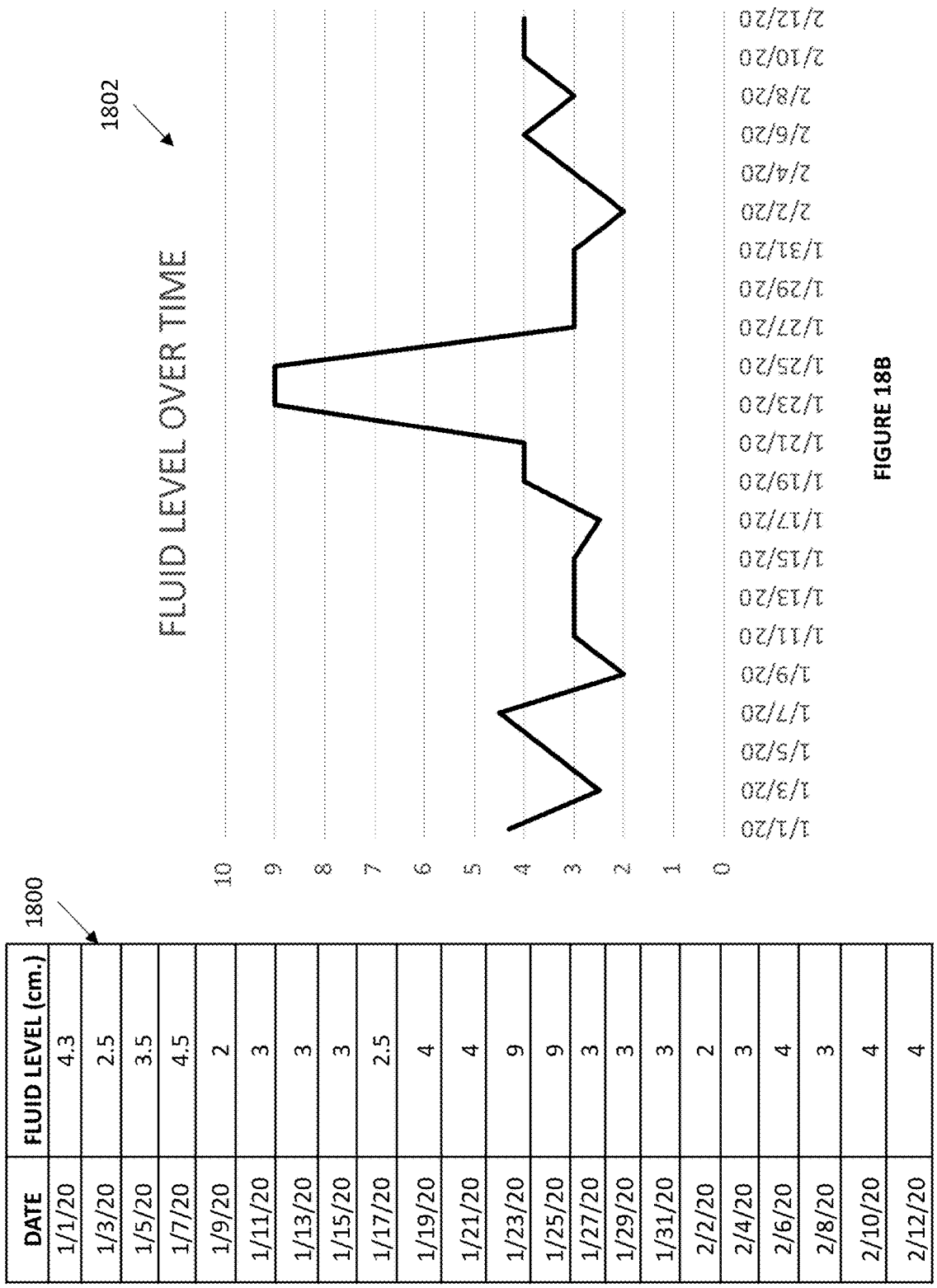

SEPTIC TANK FAILURE POSSIBILITY DETECTION AND ALERT SYSTEM AND METHOD

CO-PENDING PATENT APPLICATIONS

This Nonprovisional Patent Application is a Continuation-in-Part Patent Application to Nonprovisional Patent Application Ser. No. 62/948,137 as filed on Dec. 13, 2019 by Inventors Salvador Casillas Castillo. Provisional Patent Application Ser. No. 62/948,137 is hereby incorporated into its entirety and for all purposes into the present disclosure.

FIELD OF THE INVENTION

The present disclosure relates to alarm systems. More particularly, embodiments relate to warning or alarm systems for alerting users of the undesirable presence of liquid (such as sewage) in a line (such as a sewer line or pipe).

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The status quo of owning, maintaining, and servicing septic tanks has some room for improvement. Generally speaking, one can only know there is something wrong with the septic system at the moment, and not before, an emergency happens: the plumbing backs up—often at the worst possible time. When this happens, a distressed homeowner's first call is usually to a septic tank pumping service provider, because, whatever the actual problem is, the toilet is backing up right that moment. This is why a septic pumping business pretty much has to endure the stress of being on call 24-7 in order to be successful: septic system service is an industry that consists mostly of reacting to emergencies, and very few septic systems are equipped to give any warning before breaking down. Once the tank has been drained and the immediate emergency has been contained, a knowledgeable pumper might also fix the original problem, or advise the homeowner whom else to call within the next week or so to fix the system before the tank can fill up again, such as a plumber or contractor. However, when the system overflows like this, not only does this cause an emergency for the homeowner, but when the system backs up, the overflow also spills into the surrounding landscape, with the risk of contaminating the ground water or nearby streams and rivers with hazardous sewage. For this reason, recent legislation has demanded tighter regulation of septic systems and maintenance thereof, trying to prevent environmental contamination, leading to more red tape for homeowners, plumbers, pumpers, and contractors. Further, when one is purchasing a home with a septic tank system, there's no way to check the septic maintenance record and know whether one is buying a 'lemon'—an old, broken, problematic, or poorly-maintained septic system—and if a septic system has to be rebuilt or refurbished, the price tag can run in the tens of thousands of dollars.

It is known in the art to provide a digitally-equipped septic tank system, but this is generally a whole system, such as an Alternative Onsite Wastewater Treatment System as recognized by the California State Water Board; people getting their septic tank system entirely replaced might opt for this kind of comprehensive upgrade, especially as this also includes a water treatment apparatus that reduces the 'footprint' required for building a septic tank and the draining area(s) for its liquid contents to gradually, safely disperse through. However, short of a complete overhaul, a digital system for monitoring an ordinary septic system and providing early warnings for overflow situations is unknown in the art.

There is therefore a long felt need to provide early warnings ahead of septic system failure; there is additionally a long felt need to provide quickly accessible information related to a septic tank and its resident property and environs upon detection of a septic system failure and/or for application in efforts to plan for septic system management.

SUMMARY OF THE INVENTION

Towards these and other objects of the method of the present invention (hereinafter, "the invented method") that are made obvious to one of ordinary skill in the art in light of the present disclosure, the invented method provides a device (hereinafter, "the invented device") that provides an early warning system for septic system problems or possibly an impending malfunction or failure.

It is understood that a septic tank system generally includes one or more buried pipes leading from the house to the tank itself, and building regulations require that cleanouts be spaced at least every few feet along these pipes. A cleanout is a standard plumbing fixture for allowing access to waste-carrying pipes, so a plumber can fix clogging or other problems without (usually) having to dig up or dismantle any pipes. A cleanout generally consists of a T-junction in the pipe with the third end through which waste is not flowing extending (upward from a buried pipe, and sometimes as long as six feet) into open air, and a removable cap placed over this third end of the pipe. If the pipeline needs to be inspected or serviced, removing the cap can provide a relatively convenient access point for a pumper or plumber. A preferred embodiment of the invented device is a modified model of this same cap that includes a means for network communication and a means for monitoring water level, such that the device can be swapped out for an ordinary cleanout cap and used to monitor the condition of the septic system: when the device registers unusually high water level, an alert can be sent to warn someone when the septic system is just starting to fill up, hours or even days before the system overflows completely and causes the typical emergency. This can allow more time for pumpers to respond before emergencies happen by allowing pumpers to set up appointments during the day when systems show warnings and reduce the number of desperate emergency callouts in the middle of the night. This also holds the potential of reducing surprise overflows, and thus both preserving the local ecosystem from sewage pollution and giving a homeowner greater peace of mind, such as that the toilets aren't about to back up in the middle of a huge party.

In one preferred embodiment, a network of invented devices implemented as replacement cleanout caps are installed in a plurality of septic systems for a plurality of households, and a local service provider (such as the installer of the caps, or a service that monitors their signals as part of a septic system maintenance or insurance kind of service) monitors the caps' signals by means of a server connected to the plurality of caps over a network such as the internet. When one of the caps registers something wrong—such as a rising water level—the server registers the alert, and might inform a technician working for this service provider to take further action such as calling a pumper or a plumber, contacting the homeowner with a timely warning about the situation, or just sending out a technician from the same shop to have a look first, if it seems likely that the device might be malfunctioning or registering a low battery instead of actually reporting a plumbing issue. These various notifications could even be automated, with a computer contacting a pumper or homeowner directly rather than advising a technician to do so. Such a service might additionally advise the homeowner on ongoing septic system care and maintenance, handle all the paperwork, building regulations, and other 'red tape' associated with owning a septic system, and so forth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, websites, webpages, patents, and patent applications mentioned in the present Provisional Patent Application are herein incorporated by reference to the same extent as if each individual publication, patent, or patent application was specifically and individually indicated to be incorporated by reference. The following related art disclosures are incorporated into the present Provisional Application in their entirety and for all purposes: United States Patent Application Publication No. 20070028831 by Inventor Raymond Aniban, Jr. as published on Feb. 8, 2007 and titled "Pop-up sewer cleanout cap sensor"; United States Patent Application Publication No. 20150371526 by Inventor Tristam C. Dunn as published on Dec. 24, 2015 and titled "SEWER ALARM APPARATUS WITH PROBE EXTENDING THROUGH A MONITORED PIPE"; and U.S. Pat. No. 9,127,445 issued to Inventor Tristam C. Dunn on Sep. 8, 2015 and titled "Sewer alarm apparatus with probe extending through a monitored pipe".

BRIEF DESCRIPTION OF DRAWINGS

The detailed description of some embodiments of the invention is made below with reference to the accompanying figures, wherein like numerals represent corresponding parts of the figures.

FIG. 1A is a diagram of an ordinary prior art septic system as known in the art;

FIG. 1B is a section of the prior art septic system of FIG. 1A, presenting an ordinary prior art cleanout and cap;

FIG. 5 is a table representing the server database of FIG. 4, filled in with example data;

FIG. 16 is a diagram of a possible graphical user interface implemented on the server of FIG. 4 for a user interacting with a record of FIG. 5.

FIG. 17 is a process chart presenting possible aspects of the data analysis step mentioned at FIG. 13, in more detail.

FIG. 18A is a data chart matching the graph of FIG. 18B, presenting example fluid level data as gathered over time by the fluid level measuring device of FIG. 9 and recorded by the server of FIG. 4.

FIG. 18B is a line graph matching the data of FIG. 18A, presenting example fluid level data as gathered over time by the fluid level measuring device of FIG. 9 and recorded by the server of FIG. 4.

DETAILED DESCRIPTION OF DRAWINGS

Figure 2A:
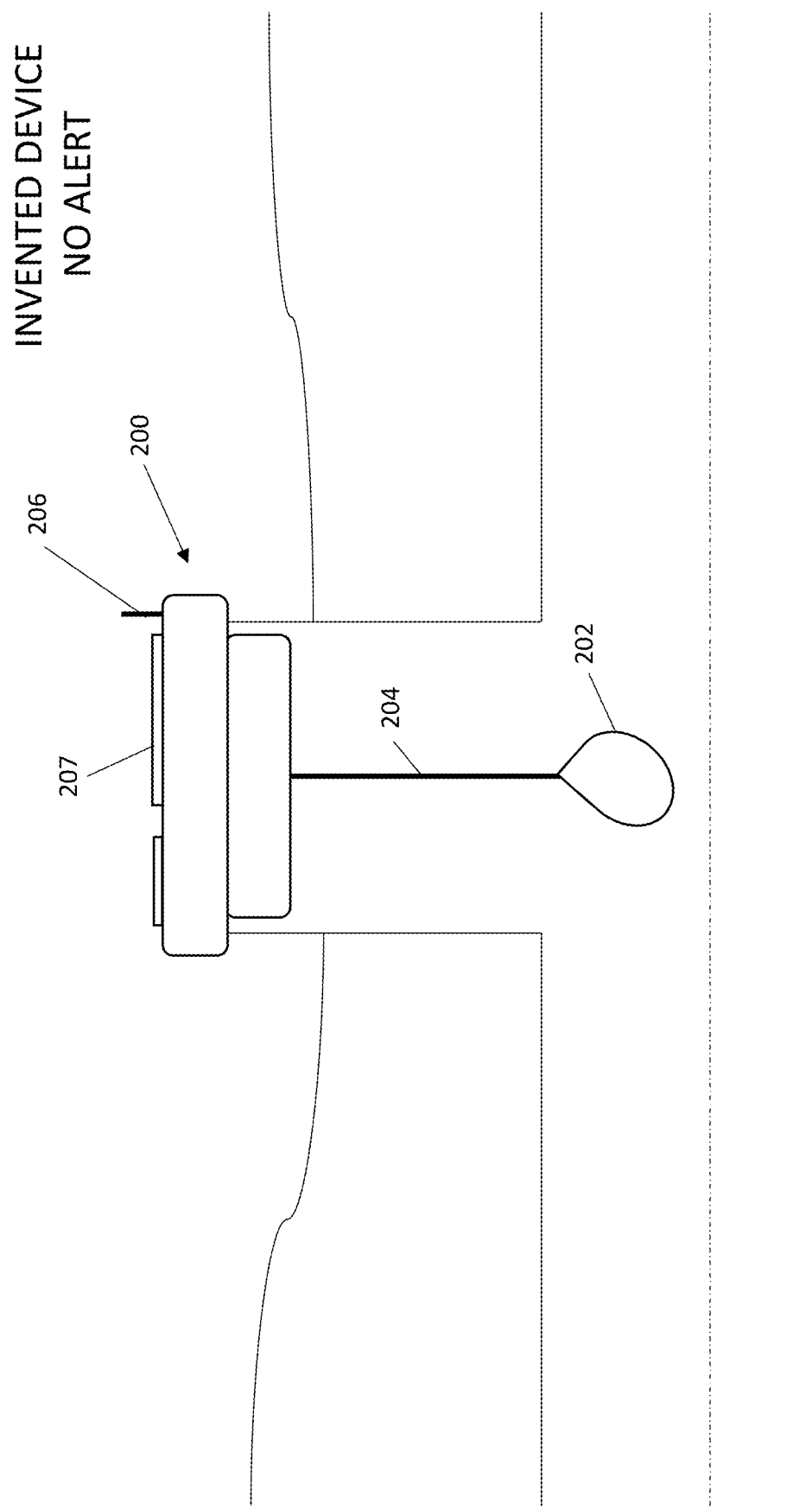
FIG. 2A is the same section of the septic system of FIG. 1B, with the prior art cap having been replaced with the invented device.

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Additionally, it should be understood that any transaction or interaction described as occurring between multiple computers is not limited to multiple distinct hardware platforms, and could all be happening on the same computer. It is understood in the art that a single hardware platform may host multiple distinct and separate server functions.

Throughout this specification, like reference numbers signify the same elements throughout the description of the figures.

Referring now generally to the Figures and particularly to FIG. 1A, FIG. 1A presents an ordinary septic system 100 as installed to support a home 100A, wherein sewage from the home 100A such as toilet waste flows from the home 100A through a pipeline 100B to be deposited into a septic tank 100C. This image is entirely prior art, and intended to visually present context and establish basic and essential element numbering for the components of an ordinary septic system 100. One notes that the exact components and placements of septic systems 100 vary between households, and this simple diagram is rudimentary and simple. This image is entirely prior art, and meant to clearly present the context into which preferred embodiments of the invented device may fit and to establish basic terminology and element numbering.

Referring now generally to the Figures and particularly to FIG. 1B, FIG. 1B presents a portion of the pipeline 100B of the sewage system 100 that includes a cleanout 102 with a cleanout cap 104 on top. A volume of sewage 106 flows along the pipeline 100B, between the home 100A and the septic tank 100C. The pipeline 100 is buried under ground 108, in this case. This image is entirely prior art, and meant to clearly present the context into which preferred embodiments of the invented device may fit, to establish basic terminology and element numbering, and to be easily comparable to the image of FIG. 2A.

Referring now generally to the Figures and particularly to FIG. 2A, FIG. 2A presents the same ordinary sewage pipeline 100C through which the volume of sewage 106 flows. In place of the prior art cleanout cap 104, a preferred embodiment of an invented smart cleanout cap 200 ("the device 200") is installed. The device 200 is shaped as a cleanout cap 104 and serves the same basic structural function of the standard cap 104, allowing installation in place of the prior art cleanout cap 104, but further includes at least (a.) a sensor means for detecting high fluid level in the pipeline 100B, presented here as a float 202 hanging by a line 204 from the device 200, (b.) a means for communicating an alert signal, visually represented here as a small antenna 206, (c.) a power source, represented here as a small upward-facing solar panel 207, and (d.) whatever circuitry (presented in later Figures) necessary or preferred as a means to cause the communication means to signal in response to the sensor means getting triggered.

Figure 2B:
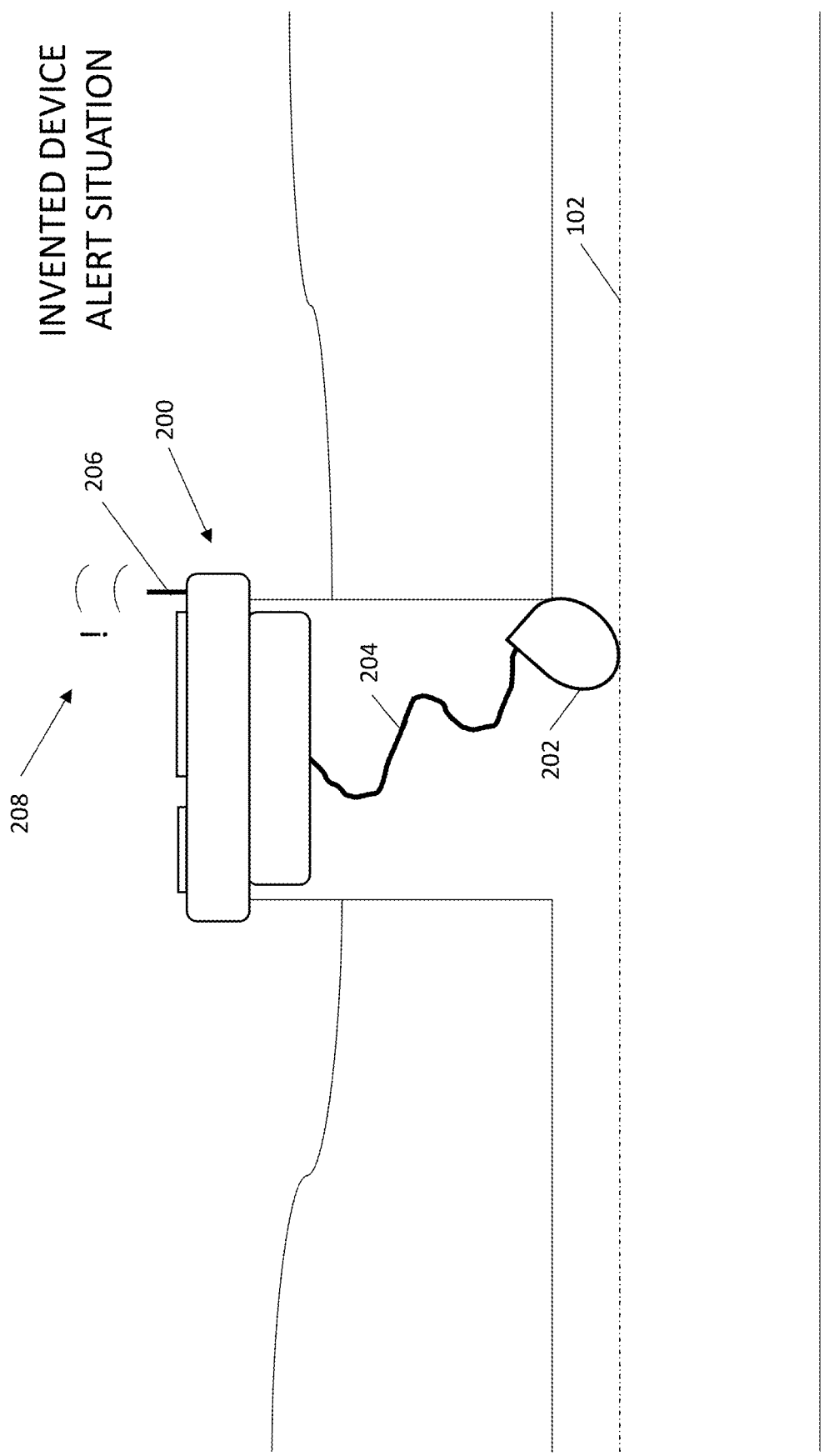
FIG. 2B is the same pipe section of FIG. 2A, presented here in a state of imminent septic system overflow.

Referring now generally to the Figures and particularly to FIG. 2B, FIG. 2B presents the pipeline 100B of FIG. 2A, now presented in a state of imminent overflow. The water level of the sewage 106 has risen, and if the sewage 106 continues to fill up the pipeline 100B and cleanout 102, the system may overflow. This condition may result from a blockage of the pipeline 100B, or something wrong with the septic tank 100C; regardless, the septic system 100 is filling up with sewage 106 and about to overflow, potentially resulting in environmental contamination of the surrounding ground 108 and toilets and/or drains backing up in the home 100A. The float 202 of the invented device 200 is lifted by the higher water level of the sewage 106; the device 200 detects that the float 202 has been lifted up, and reacts by transmitting an alert 208 to indicate that the sewage system 100 is in a state of possible imminent overflow. It is noted that the prior art ordinary pipeline 100B of FIG. 1B, unequipped with the invented device 200, has no such early warning system (unless implemented differently elsewhere in the septic system 100) and would simply overflow without warning.

Figure 3:
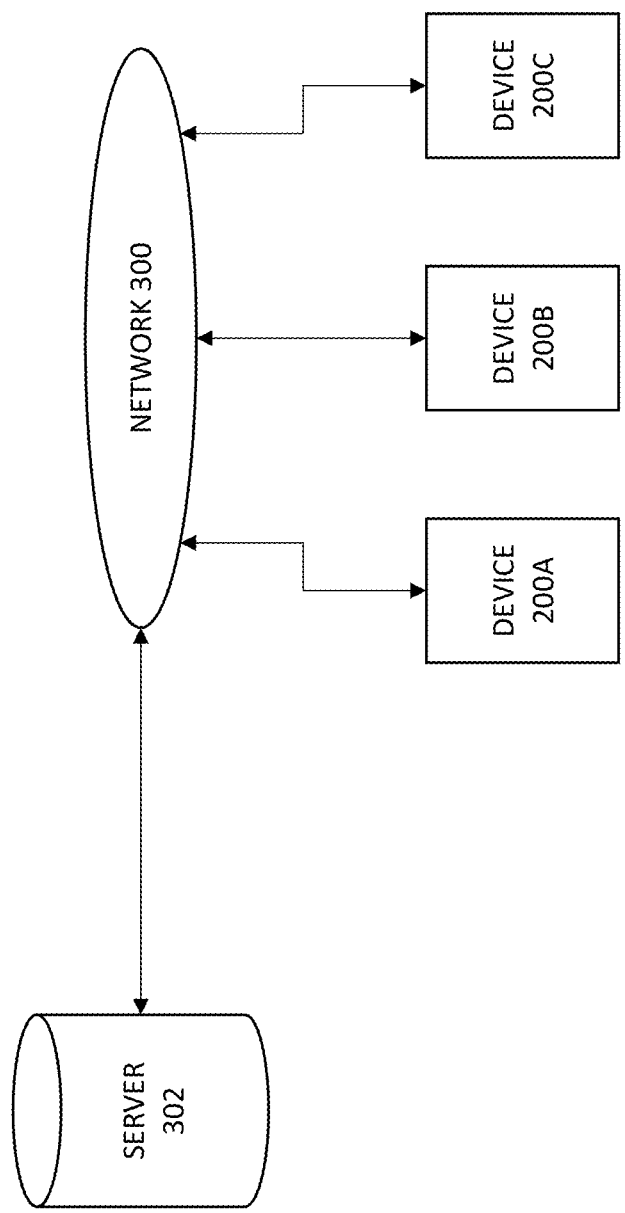
FIG. 3 is a diagram of an electronic communications network that includes a server and one or more instances of the invented device of FIG. 2A.

Referring now generally to the Figures, and particularly to FIG. 3, FIG. 3 is a diagram of an electronic communications network 300 comprising a server 302 and at least one invented device 200; this diagram presents three units, 200A-C. The method of the present invention requires at least that the connection allow for communication from the invented devices 200A-C, and to the server 302; obviously, a network implementation supporting bidirectional communication is also acceptable and may allow for additional upgrades or features. Additionally, this network may be implemented wirelessly or over cables or phone lines; on a private network or over the internet; or by any other means for building an electronic communications network known in the art or invented later on.

It is understood that the server 302 may be a software program hosted and/or enabled by, or may be or comprise a bundled computer software and hardware product such as, a.) a Z8 G4 computer workstation marketed by Hewlett Packard Enterprise of San Jose, Calif. and running a Red Hat Linux™ operating system marketed by Red Hat, Inc. of Raleigh, N.C.; (b.) a Dell Precision™ computer workstation marketed by Dell Corporation of Round Rock, Tex., and running a Windows™ 10 operating system marketed by Microsoft Corporation of Redmond, Wash.; (d.) a Mac Pro workstation running MacOS X™ as marketed by Apple, Inc. of Cupertino, Calif.; or (e.) other suitable computational system or electronic communications device known in the art capable of providing or enabling a web service known in the art.

Figure 4:
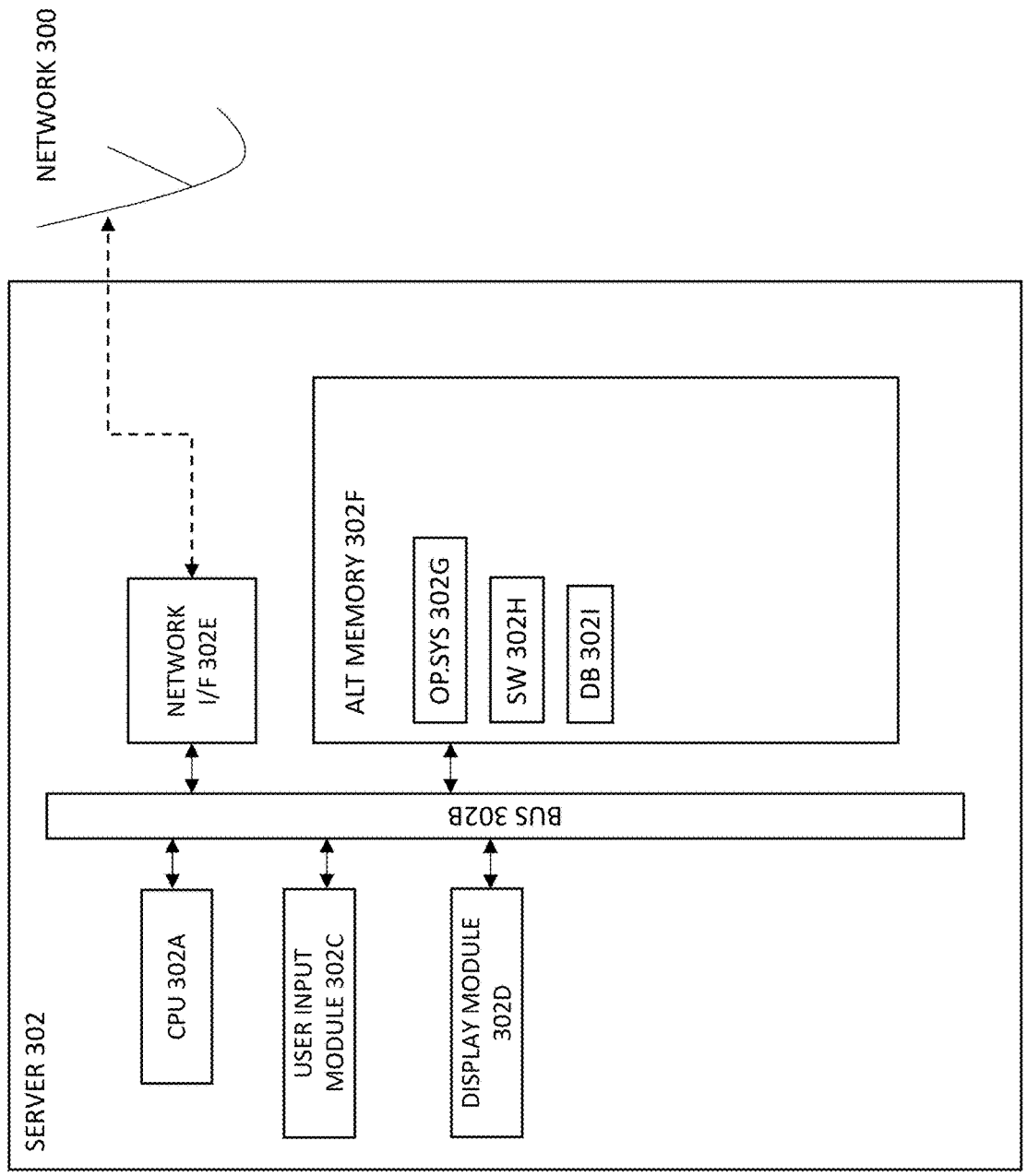
FIG. 4 is a diagram of the server of FIG. 3.

Referring now generally to the Figures and particularly to FIG. 4, FIG. 4 is a block diagram of the server of FIG. 1.

The server 302 further includes a central processing unit 302A ("CPU 202A") that is bi-directionally communicatively coupled by an internal communications bus 302B with (a.) an optional user input module 302C that accepts input, e.g., information and commands, from a user, (b.) an optional video display module 302D that provides visual information rendering output, (c.) an network interface 302E that bi-directionally communicatively couples the server 302 with the network 300, and (d.) an system memory 302F.

A server operating system software OP. SYS 202G of the server 302 may be selected from freely available, open source and/or commercially available operating system software, to include but not limited to Red Hat Linux™ marketed by Red Hat, Inc. of Raleigh, N.C. or derivative operating system, such as CentOS Linux open source operating system software; the Windows 10™ operating system as marketed by Microsoft Corporation of Redmond, Wash.; or the MacOS X™ operating system or iPhone iOS™ as marketed by Apple, Inc. of Cupertino, Calif.

Additionally, the system memory 302F includes at least what software 302H is necessary and preferred for implementing the invented method, in addition to a database 302I storing customer information for homeowners using the invented device as part of a network-based service.

Referring now generally to the Figures and particularly to FIG. 5, FIG. 5 is an example table 500 representing a hypothetical embodiment of the database 302I of FIG. 3, storing a plurality of records 502 corresponding to managed devices 200. One preferred application and embodiment of the invented device is as a data point in a service network 300 encompassing multiple household septic systems 100 equipped with one or more invented device 200, such that when the invented device 200 that belongs to a given home 100A registers an alert, the service provider monitoring that network 300 might notify the owner of the corresponding home 100A; dispatch a technician, pumper, plumber, contractor, or other specialist as indicated; or take other supportive actions as appropriate to respond to the alert 208 given by the invented device 200 before the septic system 100 can reach the point of overflow emergency. Accordingly, the server software receiving an alert from an instance of the device 200 over the network 300 looks up data in the corresponding record 502, such as whom to notify and how, and to what location to send the dispatched specialist. For purposes such as billing, taxes, customer service, providing additional service history to assist a specialist going there to fix something, automatic updating of septic system records now required by law and currently laboriously reported by individual pumpers and plumbers as these specialists provide service, and automatic updating of property management records that currently and lamentably don't include information about the septic tanks in the house one might like to buy, this database might sensibly include other information besides what is shown in the limited space available in the table 500 to present a small example, and provide full or limited access to various other parties besides just a technician monitoring for overflow alarms.

Presented in the example database table 500 of FIG. 5 are a plurality of records 502 corresponding to a plurality of instances of the invented device 200, assigned record ID numbers 001-N, hypothetically installed in several different septic systems 100 belonging to several different homeowners as indicated. In the table 500, rows are labeled 0 through 11, wherein row 0 is a header row, rows 1 through 9 and 11 represent individual database records 502 corresponding to instances of the device 200 connected to the same network 300, and row 10 represents a plurality of undepicted records implicitly present in the database, following the form of counting {0, 1, 2, 3 . . . n} and understanding the intervening ellipsis to represent all of the items between 3 and n. In the table 500, columns are labeled A through F, wherein the columns A-F of the table 500 each represent a database record data field as labeled in the header row of row 0.

For instance, please consider the example of row 1, pertaining to device 001. According to the data, device 001 is one of the three devices on this list installed in the septic system of the home of Mr. Lorem Ipsum, located at 8352 Mechanic Ave., Jackson, Tex. 77566 and reachable at 202-555-0141; the last time someone did any maintenance on that septic system, according to this sample data, was Dec.

19, 2002. The 0 in the ALERT column (column B) indicates that device 001 has not currently registered any indications of a problem. All data in this table is fictional and hypothetical, mostly generated using random generators on the internet, and is intended to demonstrate the concept of a database for tracking septic system related information. As another example, it appears from the example data presented that Avira Scott of 6 Wrangler Lane, Midland, Mich. 48640 should be notified (at 202-555-0158) that the device 005 attached to the septic system on her property is registering an alert, and a local specialist should be dispatched to have a look in the next day or two before the detected problem worsens. Device 006 is registering a higher level of alert, though, per embodiments of the invented device such as the embodiment presented in FIG. 6 that include multiple warning levels. Since this is a higher-level alert, it may be indicated to call a pumper to head over to 870 Old York Street, Riverview, Fla. 33569 right away, and in the meantime, perhaps warn Malcolm Mack that his septic system 100 is about to overflow. As a further additional example, there is no date logged for the last time the septic system 100 of Emily Meyer of row 9 received any maintenance; there's no current problem, as indicated in cell B9 of the table 500, but a comprehensive septic system management service might advise this homeowner to schedule a non-emergency specialist visit soon to get a current assessment as to the condition of this septic system 100.

Figure 6:
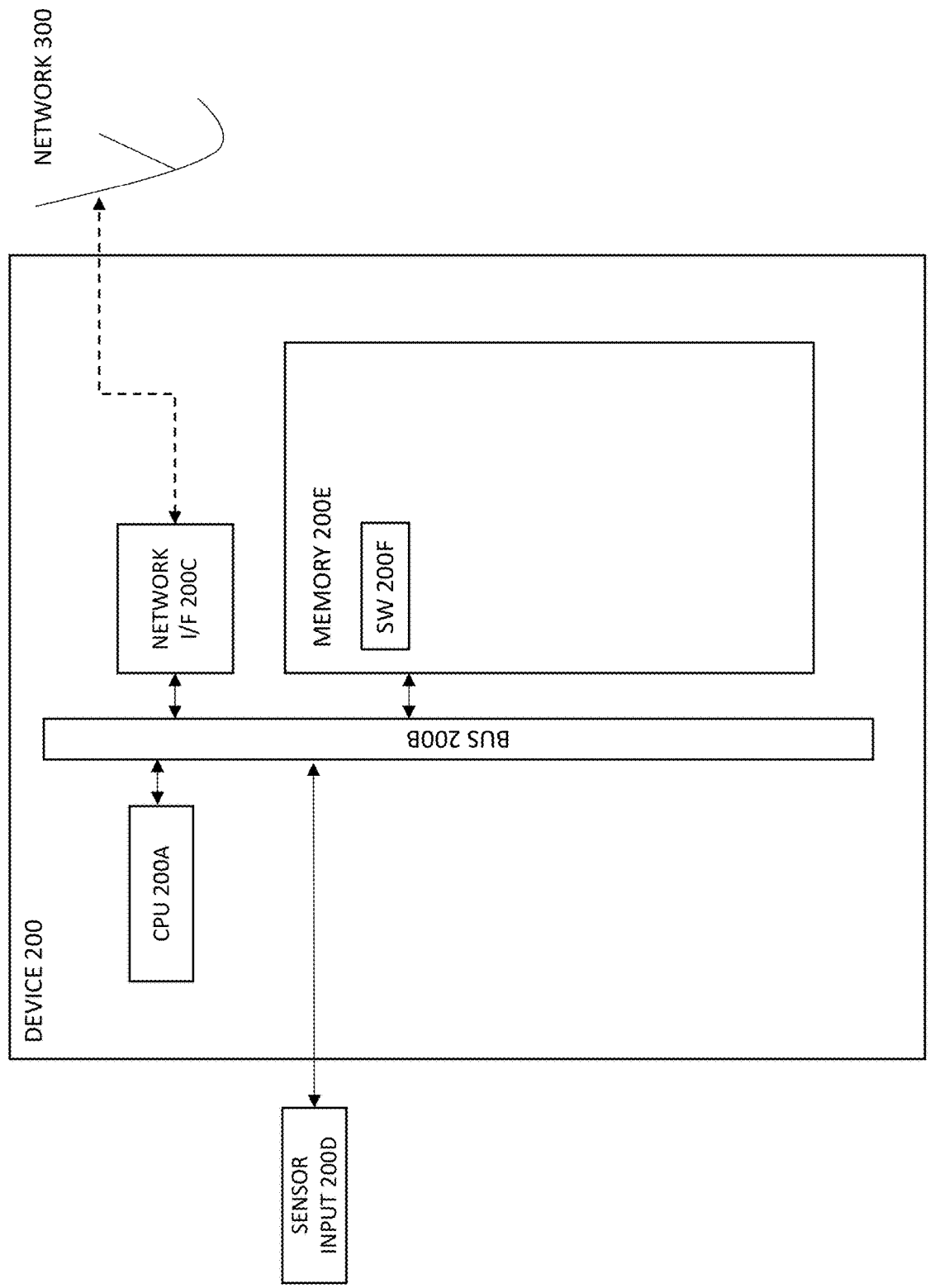
FIG. 6 is a diagram of a first preferred embodiment of the invented device of FIG. 2A.

Referring now generally to the Figures and particularly to FIG. 6, FIG. 6 is a diagram of a hardware component such as an Arduino board and attachments implemented as the invented device. The device 200 includes a central processing unit 200A ("CPU 104A") that is bi-directionally communicatively coupled by an internal communications bus 200B with a network interface 200C that bi-directionally communicatively couples the device 200 with the network 300, a sensor input 200D that registers input from the sensor monitoring water level such as the float 202 of FIG. 2A, and a system memory 200E storing software 200F necessary for implementing the invented method.

Figure 7:
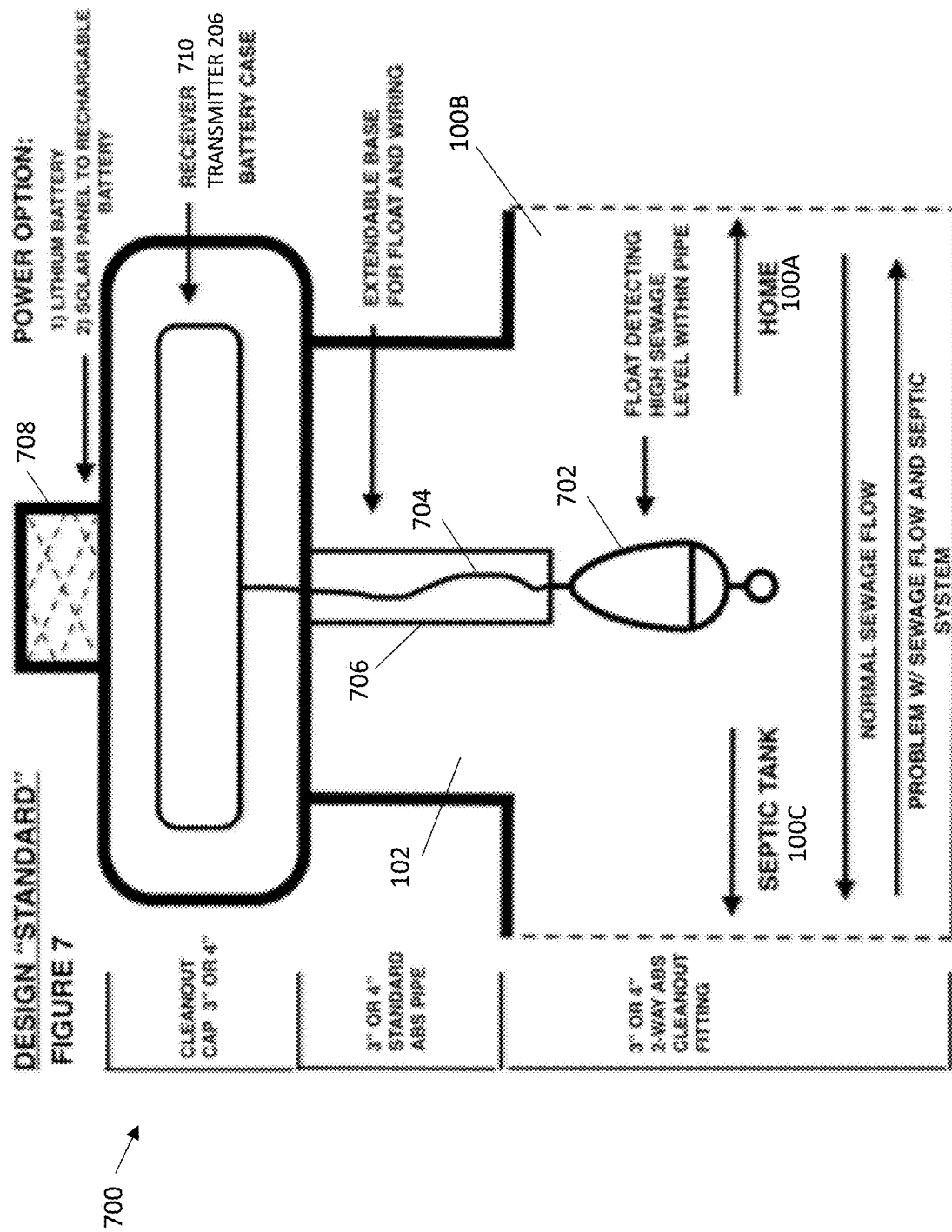
FIG. 7 is a diagram of an embodiment of the invented device of FIG. 2A that uses a float to detect high water level.

Referring now generally to the Figures and particularly to FIG. 7, FIG. 7 is a diagram of an additional preferred embodiment of the invented device 200 as included in a cap assembly 700 that attaches to the top of the cleanout 102 in a septic system 100 in place of a standard cleanout cap 104, with the high water level detection device taking the form of a dangling float 702 that, when pushed upward by a rising water level, reduces tension on the attaching line 704 and triggers the device 700 to transmit the alert 208. This alternate preferred embodiment further includes a base 706 for the float 702 and line 704. This may at least provide additional protection to the line 704 and any wiring included as part of the line 704, and allow for easier adjustability of the line 704 length when installing the invented device. Further, the base 706 may provide a 'bumper' for the float 702 when the float 702 is floating, such that instead of merely rising, the float 702 pushes upward against the base 706. This may reduce wear on the line 704 by limiting the range of motion of the float 702 and provide alternative means for detecting an alert condition (i.e. the base 706 is being pressed upward, therefore the float 702 must be rising). This alternate embodiment further presents a power option 708 which may include a lithium rechargeable battery and a solar panel to charge the battery. In this image, the rest of the circuitry is inside the cap 700, including the transmitter, the casing for the lithium battery, and also a receiver 710 for bidirectional communication with the server 302 instead of only outgoing transmissions.

Figure 8:
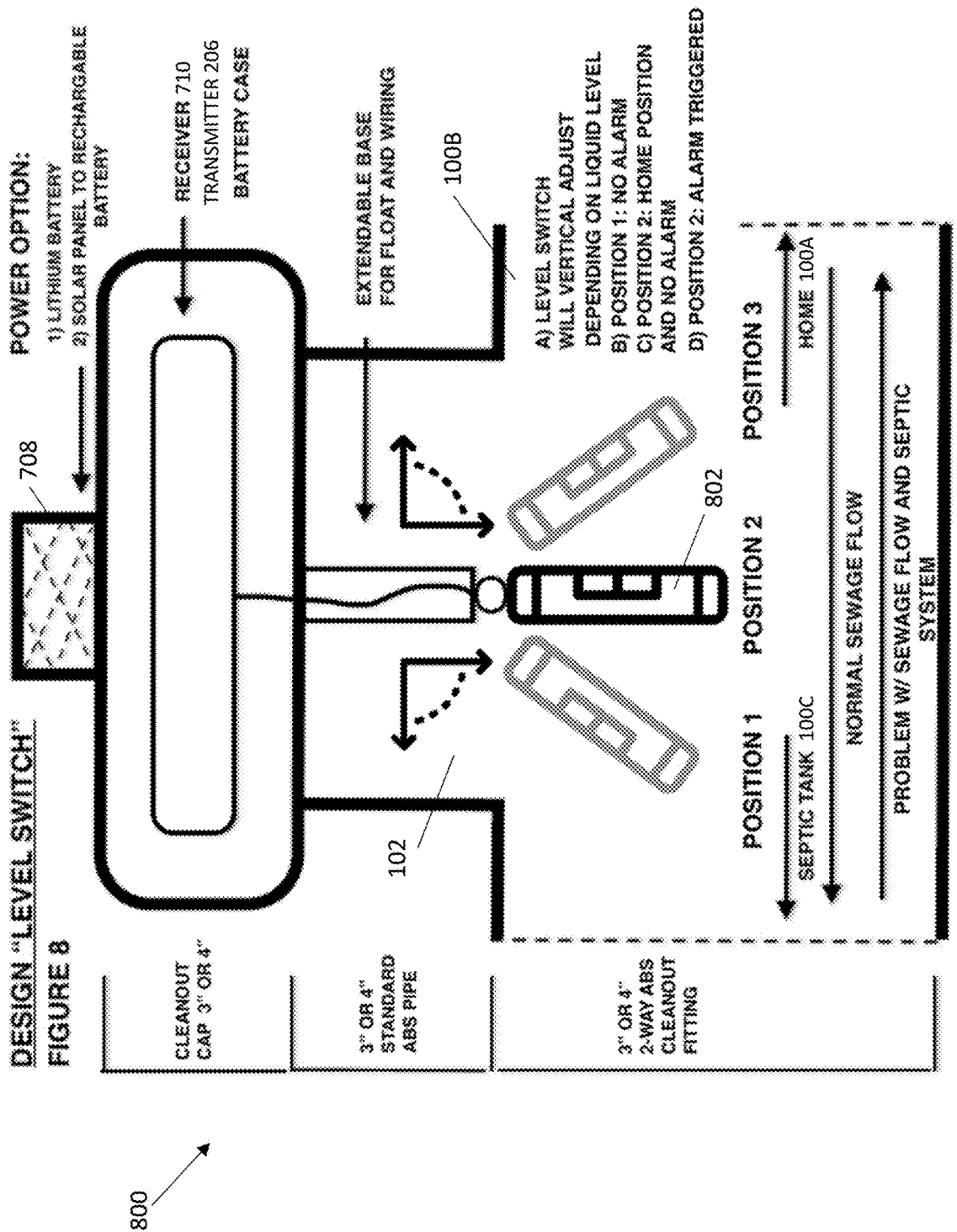
FIG. 8 is a diagram of an embodiment of the invented device of FIG. 2A that uses a flapper to detect high water level.

Referring now generally to the Figures and particularly to FIG. 8, FIG. 8 is a diagram of an additional preferred embodiment of the invented device 200 as included in a cap assembly 800 that attaches to the top of the cleanout 102 in a septic system 100 in place of a standard cleanout cap 104, with the high water level detection device taking the form of a switch 802 instead of a float 204. In this embodiment, a rising water level displaces the switch 802, and the direction of the displacement further indicates direction of flow. In Position 2 of the diagram as presented, the switch 802 is at a neutral position and hangs straight down. In Position 1, the switch is raised by liquid flowing toward the septic tank 100C; even though the liquid level is high, the septic system 100 is not in danger of backing up. In Position 3, the liquid level is both high enough to displace the switch 802, and also the liquid is moving toward the home 100A; this is an alert 208 condition, as this indicates that the way to the septic tank 100C is blocked or otherwise unavailable, and the only direction for the liquid to flow is back through the drains of the home 100A. This embodiment may reduce false positives or provide more information about current status, such as a detection of a point at which the septic tank 100C becomes full and the flow reverses direction. In the case of especially something like a heavy storm or flood, where detection of a high water level is no big surprise but can still be a problem if it gets bad enough, this kind of indication of a tipping point in where the extra liquid is going, might be very useful. The switch 802 might also be further equipped to detect further useful information, such as rate of current flow in addition to direction. It is noted that a variation of this embodiment wherein the switch 802 is at or submerged in the usual fluid level, such that the switch is only at Position 2 in zero flow and no rise in fluid level is necessary to read the current flow direction, is also possible. One notes, however, that the switch 802 might become more encumbered or encrusted from constantly partially obstructing the flow.

Figure 9:
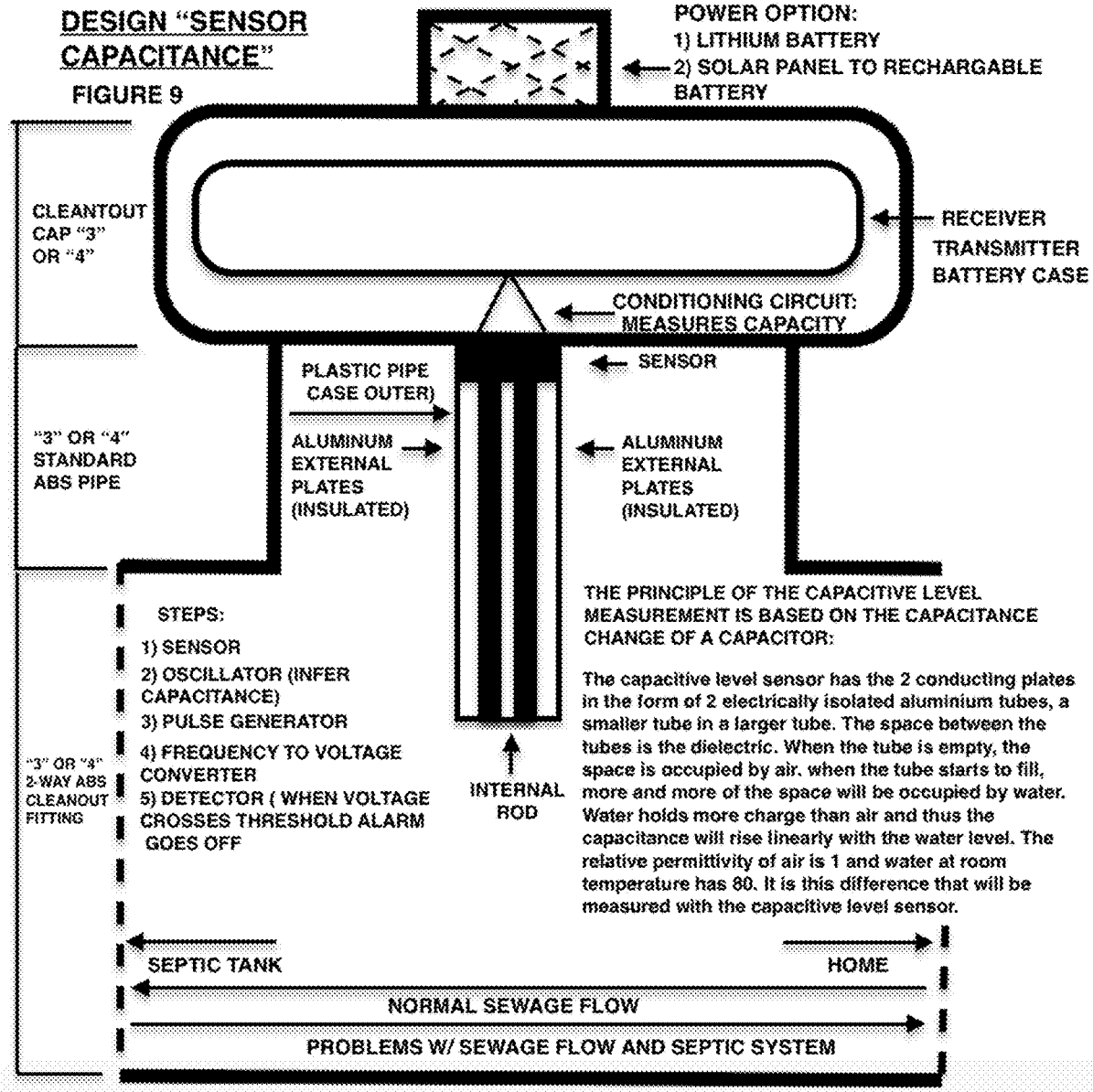
FIG. 9 is a diagram of an embodiment of the invented device of FIG. 2A that uses a capacitance testing apparatus to detect water level.

Referring now generally to the Figures and particularly to FIG. 9, FIG. 9 is a diagram of a preferred embodiment of the invented device 200 as included in a cap assembly that attaches to the top of the cleanout 102 in a septic system in place of a standard cleanout cap, with the high water level detection device taking the form of a capacitance testing device 900 that detects rising water level by testing the conductivity of the medium in which the sensor is sitting, and triggers the alert 208 when surrounded by liquid instead of air.

It should be noted that the different means for detection of water within a given volume as used by the embodiments presented herein do not comprise an exhaustive list of such means, and are meant only as representative examples. An embodiment of the invented device 200 may detect rising water level or otherwise assess that the septic system 100 is filling up with material and will soon overflow unless emptied or repaired, by any suitable means for determining this. Additionally, the invented device 200 may be powered by any means suitable, including, as three non-limiting examples, regularly replaced batteries, an electrical cord plugged into a household power grid, or a solar panel installed on top of the cap of the device 200.

Figure 10:
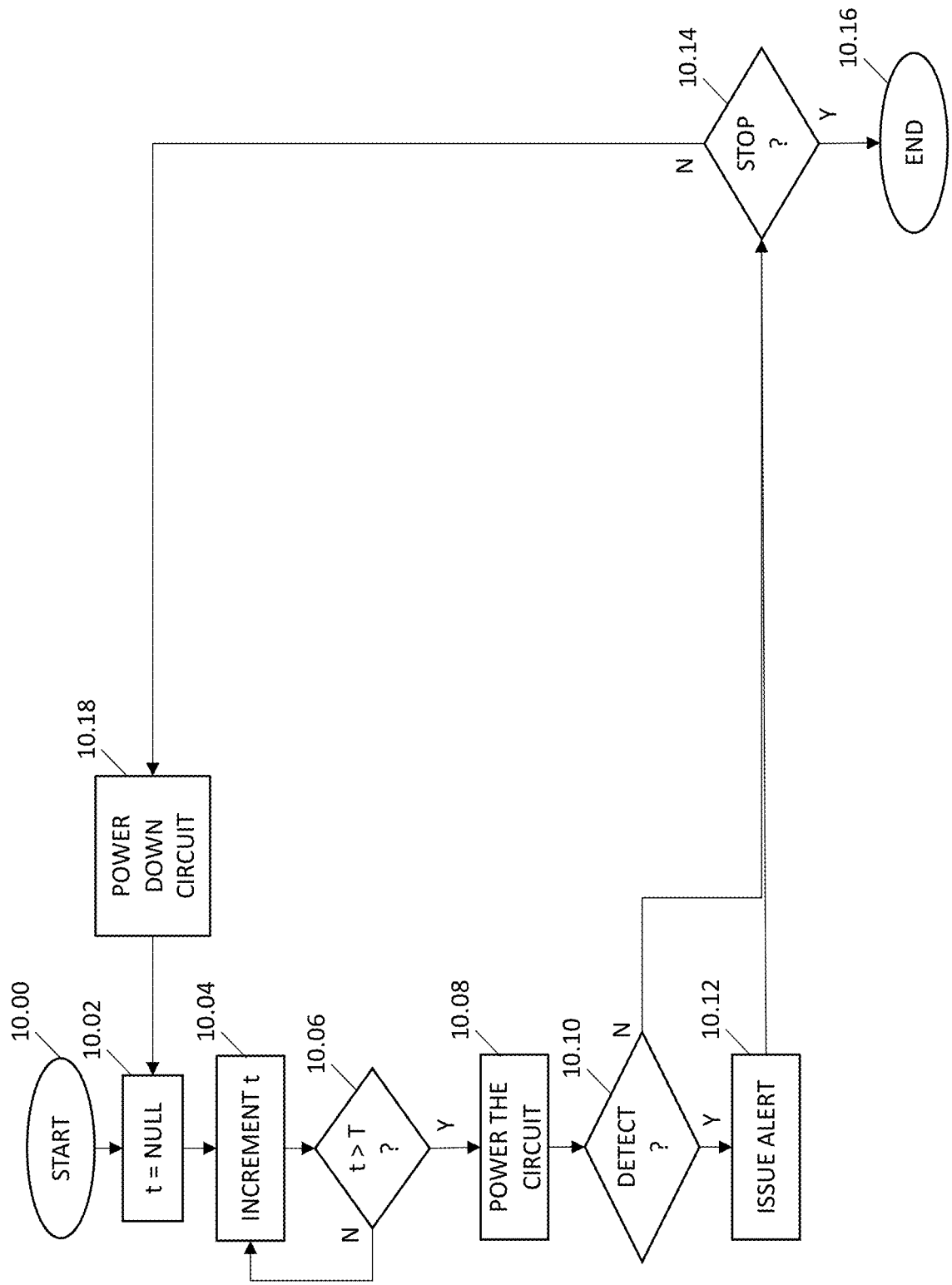
FIG. 10 is a flow chart presenting regular operation of the device of FIG. 2A, with a power-saving method included to only periodically turn the entire device on and test.

Referring now generally to the Figures and particularly to FIG. 10, FIG. 10 is a flow chart presenting a method followed by a single invented device unit monitoring a septic system. In this embodiment, the device 200 is configured to save power and prolong battery life by periodically, rather than constantly, checking for high water level; for instance, even if the device 200 only checks on the water level twice or three times a day, the device 200 will still catch an overflow within twelve or eight hours of the system 100 starting to fill up.

In step 10.00, the process begins. In step 10.02, whatever means is used to register the counting variable t, used to count time between checks, is initialized to 0 or NULL. At this point, the device 200 is at minimal power, in a 'standby mode' sufficient to keep the counter going as indicated. In step 10.04, t is incremented. In step 10.06, if the value of t registers that it's not time for another check (i.e. the value of t counting the time interval since the last check, is less than a value T indicating that it's time for a check now), t is incremented again in step 10.04, checked again in step 10.06, and so on, ticking away until it's time for another check. When it's time (t==T), the rest of the device 200 is powered on in step 10.08, and the device 200 checks on the water level. In step 10.10, if an alert condition is detected, then in step 10.12 the device 200 transmits the alert 208. Otherwise, if no alert condition is detected, then no alert 208 is transmitted. Regardless of whether an alert 208 was transmitted, in step 10.14 if the device 200 has been shut off or uninstalled, this otherwise-endless loop may end at step 10.16. If the device 200 has not been shut off, then a new cycle of standby begins. At step 10.18, the device 200 powers down into standby mode and at step 10.02 the value of t is reset to NULL or 0. This cycle continues indefinitely as long as the device 200 is operating. In other embodiments, the device might, once an alert condition has been detected, stay on and continue monitoring more closely until the device no longer registers an alert, rather than going 'back to sleep' for a while before checking again. If the device is ever manually shut off or otherwise made to stop working, the process ends; otherwise, this process is an endless loop. It is noted that a problem with the device 200 itself, such as a low battery or detected malfunction, may also constitute an alert condition triggering an alert 208, and ideally such a malfunction yields a warning by generating an alert 208 long before the same condition might become a condition that incapacitates the device 200 entirely, resulting in the stop condition of steps 10.14 and 10.16.

Figure 11:
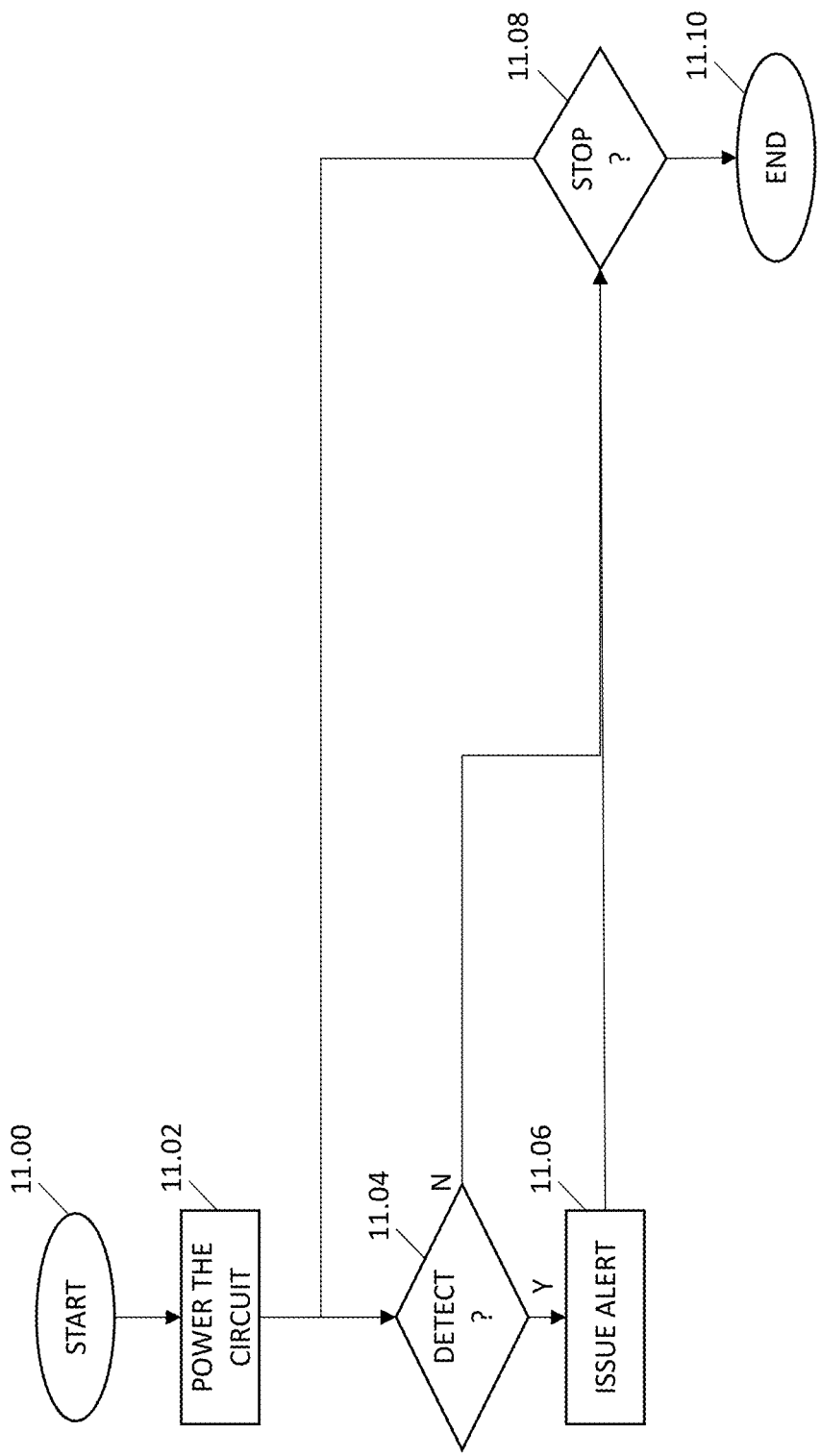
FIG. 11 is the flowchart of FIG. 10, in an implementation wherein the device is always on instead of periodically.

Referring now generally to the Figures and particularly to FIG. 11, FIG. 11 is a flow chart presenting a method followed by a single invented device unit monitoring a septic system. In this embodiment, the device is not configured to save power and prolong battery life by periodically, rather than constantly, checking for high water level; the device is monitoring constantly, without incrementing t or turning the device on and off. This embodiment may include the benefit of being very simple, and therefore likely to be easy to implement cheaply.

In step 11.00, the process begins. In step 11.02, the device 200 is activated. In step 11.04, the device 200 checks on the water level, such as by taking sensor data. If the device 200 registers that the water level is too high, then in step 11.06 the device 200 registers an alert condition and transmits the alert 208 to the server, then continues monitoring; else, the device simply continues monitoring without sending the alert 208. Step 11.08 represents the condition that the device 200 is ever purposefully shut off or otherwise made to stop working; if so, the process ends at step 11.10. Otherwise, this process is an endless loop.

Figure 12:
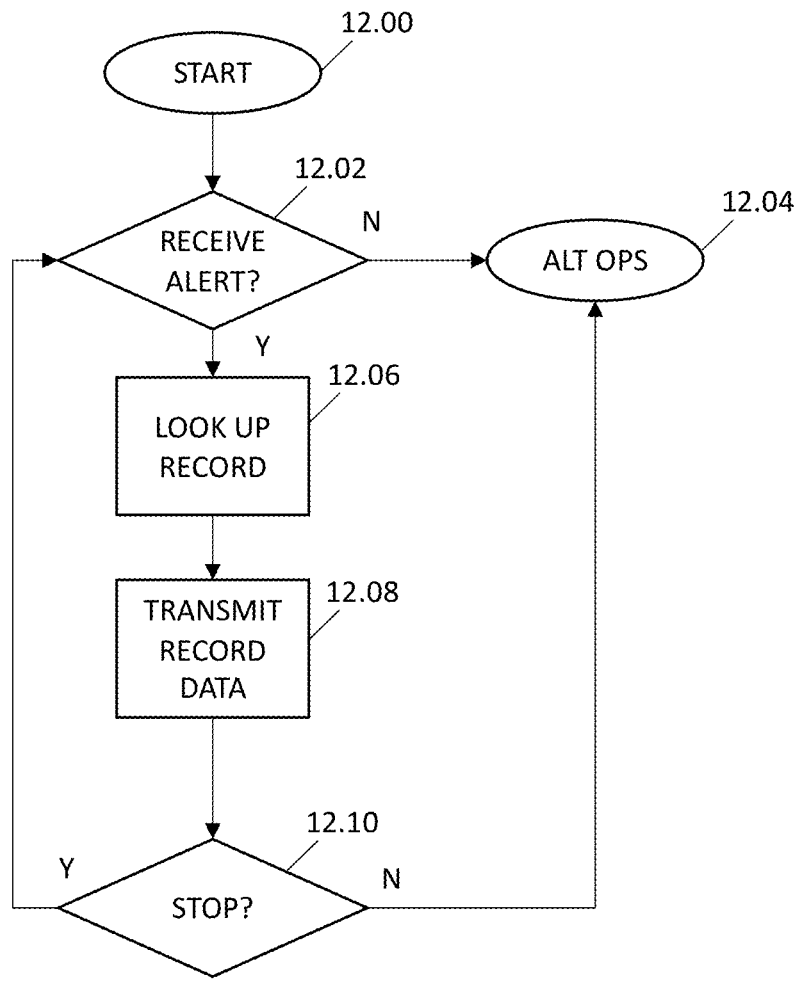
FIG. 12 is a flowchart of the server side receiving the alert of FIG. 2B, and responding to the alert.

Referring now to the Figures and particularly to FIG. 12, FIG. 12 is a flow chart of a possible method followed by the server 302 receiving the alert 208 transmitted by the device 200 monitoring a homeowner's septic system 100.

In step 12.00, the process starts. In step 12.02, the server checks as to whether the alert 208 has been transmitted from any of the connected devices 200 of the network 300. If not, in step 12.04 the server 302 may move on to other tasks (ALT OPS) unrelated to the method described herein and not shown. If the alert 208 has been received, in step 12.06 the server 302 looks up the record 502 corresponding to the device 200 from which the alert 208 was received. The data stored in the record 502 may then be used to notify the homeowner, dispatch a specialist, or other services that might be provided once the system has registered the warning given by the device; this record 502 data is transmitted accordingly to provide these services. The server 302 would be ongoingly waiting in an infinite loop to check for, receive, and process alerts, unless manually stopped or reprogrammed to do other tasks.

Figure 13:
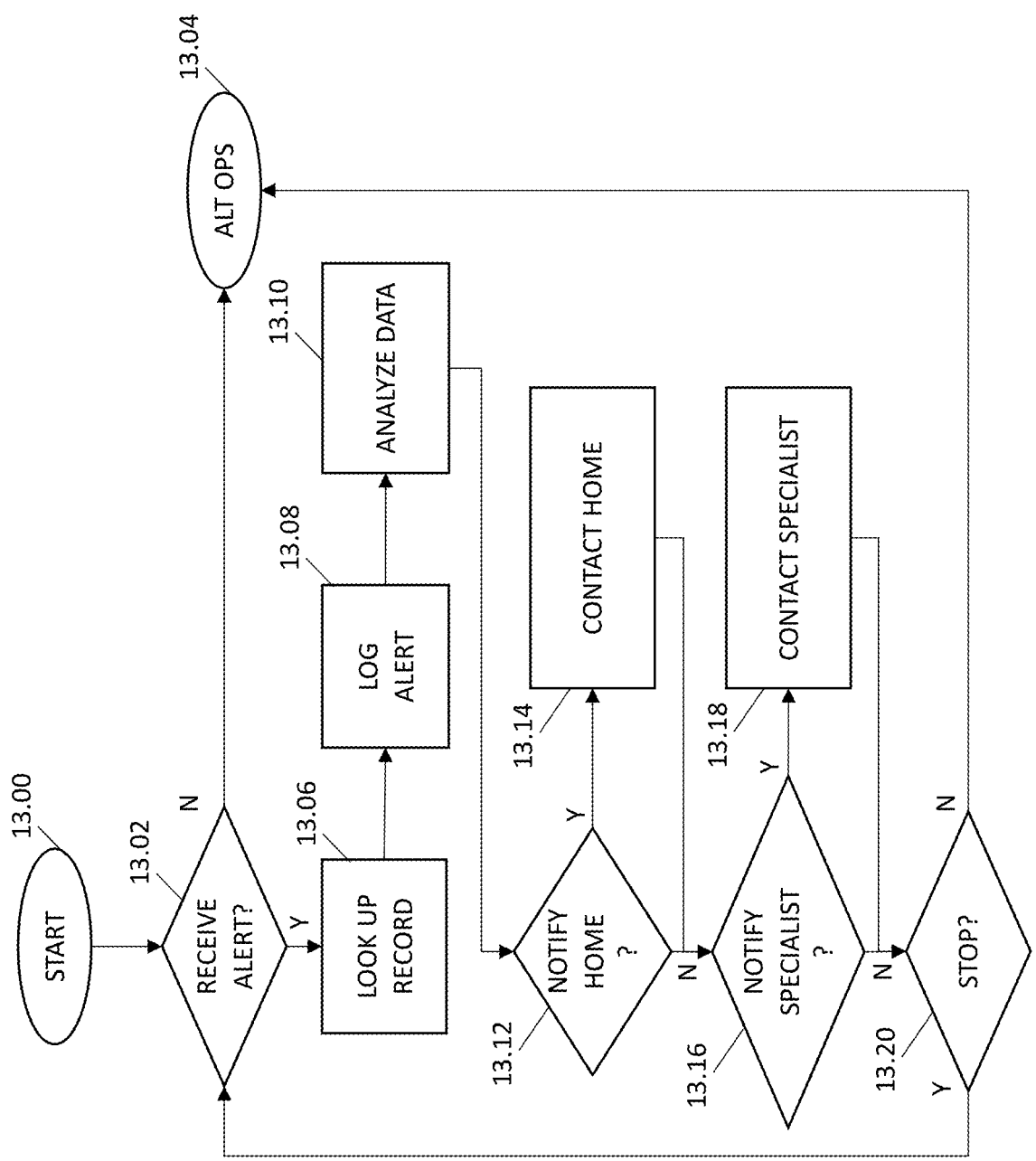
FIG. 13 is a flowchart of the server-side functionality for the server of FIG. 3, wherein an alert signal is acted upon within the same server environment, rather than passed on to a technician or other device.

Referring now generally to the Figures and particularly to FIG. 13, FIG. 13 is a server-side flow chart presenting further actions that may be taken by the server 302 in response to receiving the alert 208 from an instance of the device 200 managed by this server 302. In step 13.00, the process starts. In step 13.02, if no alert 208 is received, the server 302 may continue to other unrelated operations (ALT OPS) not relevant to the method of the present invention. If the alert 208 is received, then in step 13.06 the record 502 corresponding to the device 200 from which the alert 208 originated is looked up. In step 13.08, the selected record may be amended to log or record that the alert 208 was received and when, such that a history of previously registered device alerts 208 is available as part of the record 502. This history may be useful in a variety of ways, such as providing a full service record that includes mechanically detected problems and their solutions; assessing the urgency of the present alert 208, such as in the case that the same alert 208 from the same device 200 has persisted for a certain duration of time; or even diagnosing a possible cause of the alert condition triggering the alert 208, such as raising the possibility of a faulty device 200 if the alert 208 is intermittent or irregular. In step 13.10, the server 302 may enact some analysis in software regarding the received alert 208 to determine a course of action to take or recommend; an example of such analysis is presented with more detail in FIG. 17. In step 13.12, the server 302 determines whether to notify the home 100A corresponding to the septic system 100 that generated the alert 208. This may be a facilitating prompt for a technician operating the server to pick up a telephone and make a call (and log the call in the record history once completed, preferably), or automated by algorithm and implemented by a mechanism such as automated text alerts, emails, or voice messages as known in the art. If it is indicated to contact the home 100A, in step 13.14, the home 100A is contacted. In step 13.16, it is determined where to contact a specialist, such as a septic pumper, plumber, contractor, or device technician, and request that the specialist go to the location of the device 200 (as listed in the record 502) and fix or service the septic system 100. For instance, if an imminent overflow is detected in the middle of the night, an automated alert to a 24-hour septic pumping service might be a great benefit, while the server 302 waiting until morning to relay the alert 208 to a technician or homeowner to act upon may happen too late in some circumstances. This level of automation of messaging may not be indicated in all cases, and it would be up to the homeowner and the operator(s) of the network monitoring system to determine what is appropriate and useful. If indicated, the specialist is contacted in step 13.18. It is noted that recorded service history in the record 502 may also indicate a previous or 'regular' service provider, or an additional record field might list a preferred service provider to contact on the homeowner's behalf; in absence of this, the business managing the device network 300 may have a network of certain specialists in certain locales that they deem trustworthy or prefer to do business with. The server 302 may look up and provide this information to a technician making the call, or if directed, contact the specialist with an automated message. In step 13.20, if the server 302 is manually disabled or otherwise instructed to cease monitoring, this process may end and the server 302 may be repurposed to other tasks instead; otherwise, this is an endless loop, and once the alert 208 has been responded to appropriately, the server 302 awaits the next one. It is also noted that a server 302 with multi-threaded processing ability might process multiple alerts 208 at once.

Figure 14:
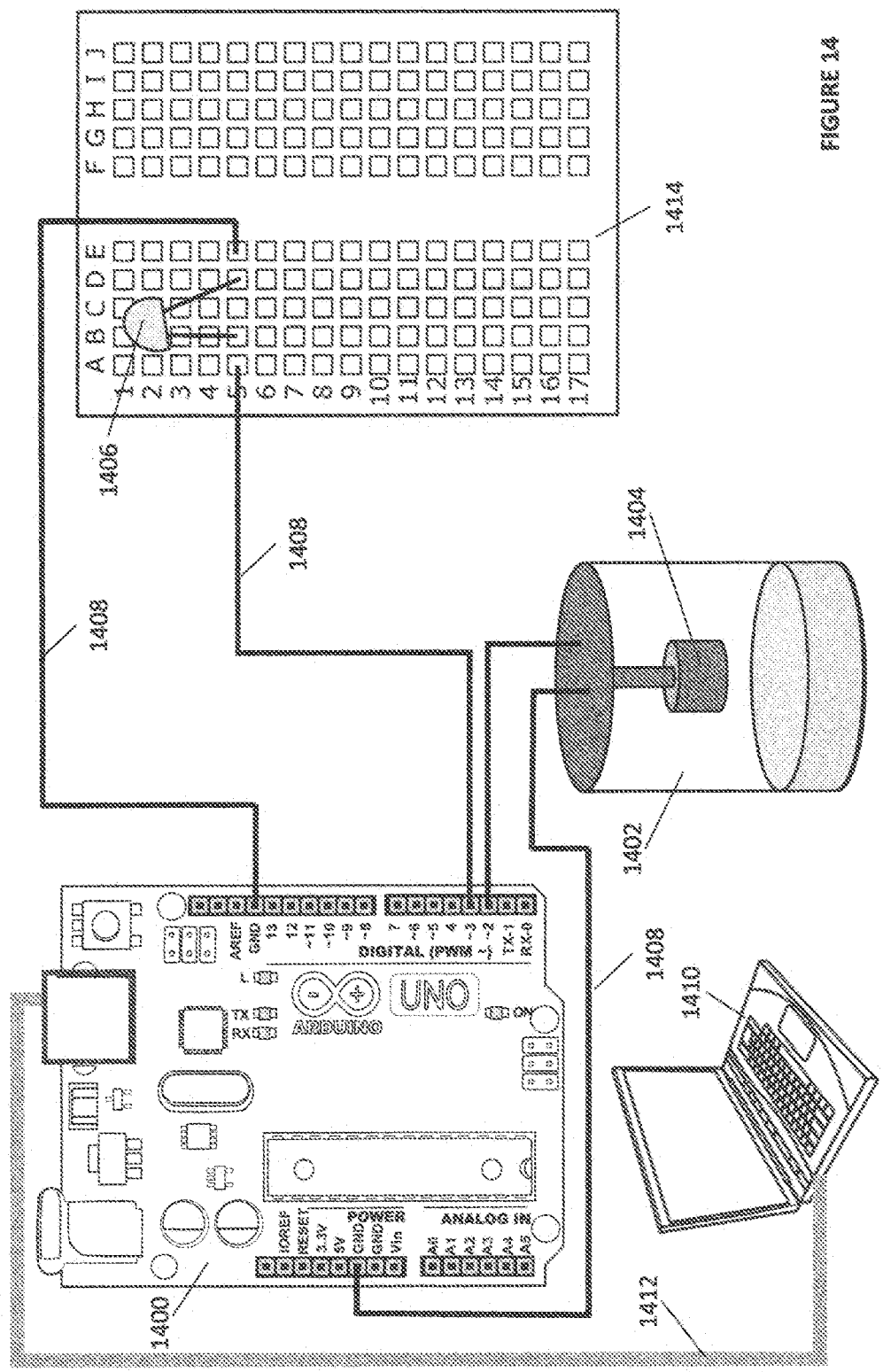
FIG. 14 is a diagram of a prototype implementation of the invented device of FIG. 2A as constructed with an Arduino board.

Referring now generally to the Figures and particularly to FIG. 14, FIG. 14 is a diagram of a prototype device 200, implemented using a programmed Arduino board 1400, a water container 1402 for selectively simulating a flooded pipe, a float sensor 1404, an LED 1406 for registering an alert 208 response, and a plurality of wires 1408 connecting the components as required. The Arduino board is connected to a computer 1410 via a USB serial cable 1412; this kind of setup is standard for programming and powering an Arduino board, though once programmed an Arduino can also be powered by a different power source independent of a computer USB connection. A bread board 1414 provides generous space in which to interconnect the wires 1408 of the prototype implementation presented in the diagram, rather than fitting all connections tightly onto the Arduino board itself.

In constructing the build of the diagram, the following materials list was recommended:

Arduino Uno (the Arduino board 1400)
USB Cable Type A to B (the USB serial cable 1412)
Male to male jumper wire (the plurality of wires 1408)
LED (the LED 1406)
Resistor (220 ohm)
Polypropylene float switch (the float sensor 1404)

In the circuit, pin 2 of the Arduino board 1400 is connected to a first terminal of the float sensor 1404 by a wire 1408, and a second terminal of the float sensor 1404 is connected to ground on the Arduino board 1400, thus completing the circuit. The LED 1406 is installed on the bread board 1414 for convenience, and wires 1408 connect a first terminal of the LED 1406 to pin 3 of the Arduino board 1400 and a second terminal of the LED 1406 to ground on the Arduino board 1400.

In this prototype of a preferred embodiment, the Arduino board 1400 is programmed with the following source code:

```
1    int FloatSensor=2;
2    int led=3;
3    int buttonState = 1; //reads pushbutton status
4
5    void setup( )
6    {
7      Serial.begin(1600);
8      pinMode(FloatSensor, INPUT_PULLUP); //Arduino Internal
         Resistor 10K
9      pinMode (led, OUTPUT);
10   }
11   void loop( )
12   {
13     buttonState = digitalRead(FloatSensor);
14       if (buttonState == HIGH)
15       {
16         digitalWrite(led, HIGH);
17         Serial.println( "WATER LEVEL - HIGH");
18       }
19       else
20       {
21         digitalWrite(led, LOW);
22         Serial.println( "WATER LEVEL - LOW" );
23       }
24     delay(100);
25   }
```

The standard template for an Arduino program (or "Sketch") is: (1.) a function called setup( ), which is run once to initialize the starting conditions of the program, and (2.) a function called loop( ), which runs continuously after setup( ) has been run first, as long as the board is powered. Software objects and hardware objects are associated via pin numbers; a standard Arduino board such as the Arduino board 1400 of the diagram has a plurality of sockets labeled with numbers, in which to stick 'pins' such as the ends of the wires 1408 of the diagram.

In this code at line 1, the variable FloatSensor is instantiated and set to the value 2. At line 2, the variable led is instantiated and set to the value 3. At line 3, the variable buttonState is instantiated and set to the value 1. In Arduino coding, these software elements are functionally the same, as their syntax indicates; however, it's useful to notice and bear in mind that buttonState is a variable that changes value and stores the current alert state, while FloatSensor and led represent the hardware objects for which they're named and store or represent the appropriate pin numbers (pin 2 of the Arduino board is connected to the float 1404, pin 3 of the Arduino board 1400 is connected to the LED 1406) for interacting with these hardware elements. A read of the code will confirm that these latter two values never change once set and could have been represented as constants, and these values' being stored into intuitively-named variables "FloatSensor" and "led" is merely to allow use of more legible placeholders for these constant values pointing to circuits holding hardware objects.

In the function setup( ) starting at line 5 (which is void, i.e. does not return a value as a result of the function), a serial communications port is opened, allowing a text data log to be sent via the USB serial cable 1412 and stored on the laptop 1410. Additionally, in lines 8 and 9, the pinMode of each hardware object represented in the code is set, such that FloatSensor (at pin 2) is treated as a source of input, specifically INPUT_PULLUP. The input mode INPUT_PULLUP indicates a logic inversion; the input mode INPUT would indicate that the default state of a push-button is LOW until someone presses the button and makes the state HIGH (i.e. off until turned on), while INPUT_PULLUP indicates that this input source is on until turned off. The object led (at pin 3) is treated as an output device. The function setup( ) ends at line 10 of the code.

The function loop( ), starting at line 6, codifies the ongoing operation of the Arduino circuit, once setup is complete, and loops until stopped. At line 13, the current state of the floating sensor is read as input from FloatSensor, into the state variable buttonState. This read value will be either HIGH or LOW, depending on whether the connected circuit is above or below a preset voltage. Logic codified in electronics relies on signals of high voltage (HIGH) and low voltage (LOW) to represent the dichotomy of true or false, 1 or 0, on or off. In this case, a reading of HIGH indicates that the float 1404 has been raised and triggers an alert condition, and a reading of LOW indicates that the float 1404 has not been raised and the water level is normal. At lines 14-18, a conditional statement addresses the HIGH case. If buttonState is HIGH, then at line 16 an output value of HIGH is transmitted to the LED 1406, instructing the LED 1406 to light up. At line 17, the Serial connection to the computer 1410 as opened at line 7 is used to add a text log entry: "WATER LEVEL—HIGH". At lines 19-23, the other case, LOW, is addressed. At line 21, an output value of LOW is transmitted to the LED 1406, instructing the LED 1406 to not light up or to turn off if currently lit. At line 22, the Serial connection to the computer 1410 as opened at line 7 is used to add a text log entry: "WATER LEVEL—LOW". Regardless of which value was registered, line 24 codifies a brief delay before the next reading is taken.

When liquid is poured into the container 1402 and the container 1402 floods, thus floating the float sensor 1404, the upward movement of the float sensor 1404 closes the otherwise-open circuit to the Arduino board 1400, thus resulting in the value of that circuit being read as HIGH. When the container 1402 contains little or no liquid, the float sensor 1404 is not lifted up, the circuit remains open, and the voltage of the circuit at pin 2 of the Arduino board 1400 remains LOW.

It is noted and understood that the invented device 200 as manufactured for only the invented function would not require a whole Arduino board, which is a versatile, open-ended, easily modified environment for designing and implementing programmed hardware circuits. While an Arduino has several connections available for use in different designs and applications, an electronic mechanism built to do a single, specific task, such as operate the invented device 200, need only include the circuits, connections, and hardware actually in use. It would be a fallacy to see an Arduino board implementation and assume that the invented method or device must be complicated enough to be explicitly limited to use of an Arduino, a processor, or some equally sophisticated control device. In the simplest embodiments, the circuitry of the invented device may constitute a power source, a pushbutton, a transmitter, and couple pieces of wire, with the logic implemented within the circuit itself. Naturally, more sophisticated features may require more sophisticated technology also, as found to be necessary in ordinary application of skill in the art of electronics, software, and hardware. For an example of this kind of implementation, please see FIGS. 15A and 15B, presenting the invented device implemented as an electrical circuit.

Figure 15B:
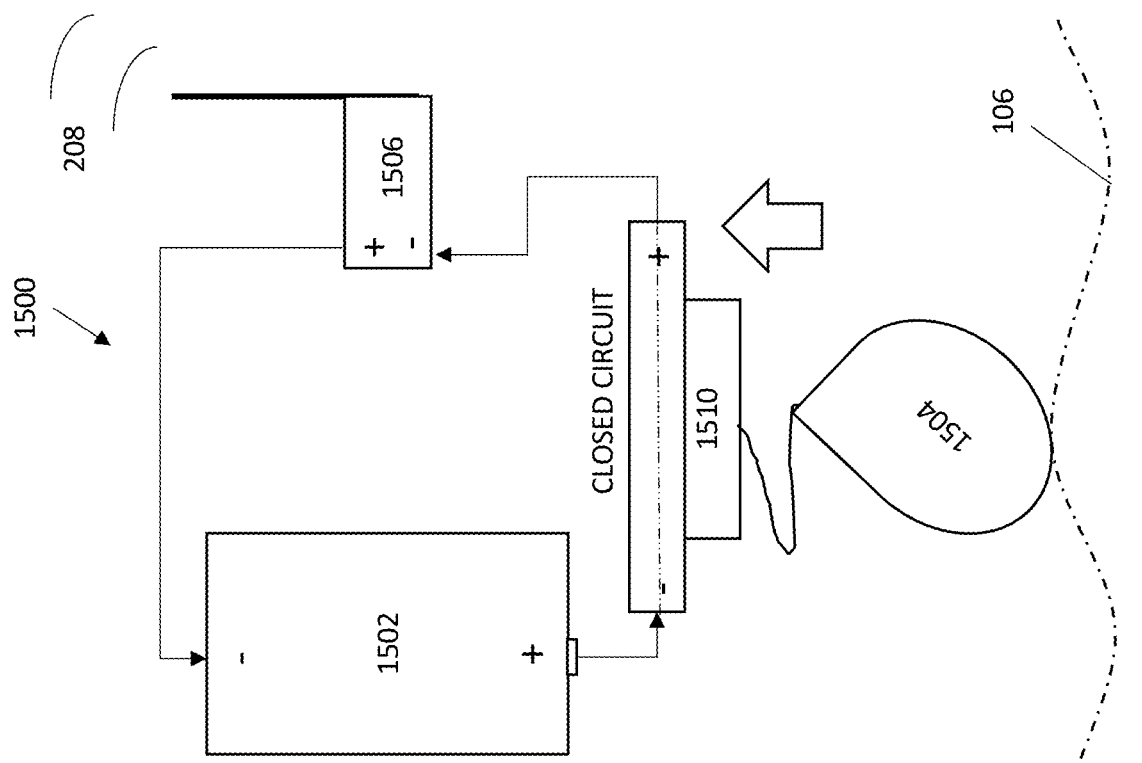
FIG. 15B is a diagram of an electronic circuit for implementing a preferred embodiment of the invented device of FIG. 2A, with the circuit in an alert-generating state.
Figure 15A:
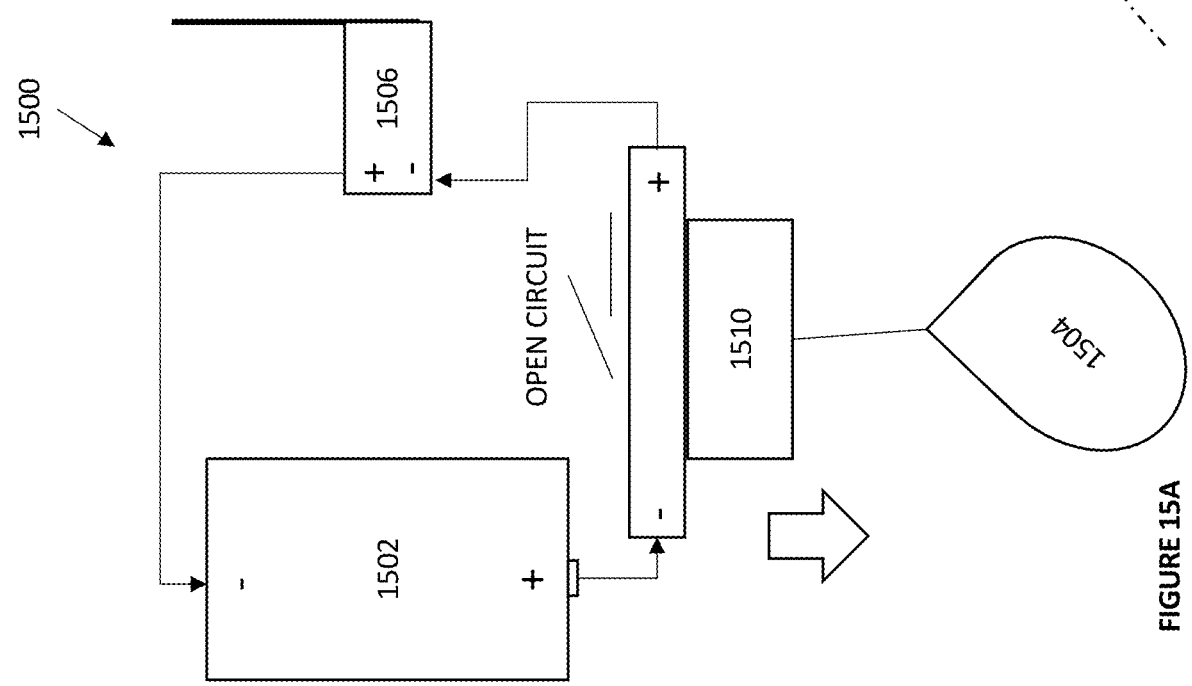
FIG. 15A is a diagram of an electronic circuit for implementing a preferred embodiment of the invented device of FIG. 2A, with the circuit in a non-alert-generating state.

Referring now generally to the Figures and particularly to FIGS. 15A & 15B, FIGS. 15A & 15B are two diagrams of the invented device mechanism implemented as a hardware circuit 1500 which includes a power source 1502, a float 1504, a transmitter 1506, and wiring 1508 connecting these elements into an electrical circuit 1500. As anyone even a little skilled in the discipline of electronics knows, electrical current in a circuit only flows if the circuit forms a closed path of conductive material such that electrons can flow from positive to negative; even a small gap can prevent this flow, leaving any device connected to that circuit unpowered. This is the general premise behind a simple control device such as a light switch; when the light switch is in an 'off' position, the connected circuit is left incomplete, and turning the switch 'on' moves a conductor such as a piece of metal such that the circuit is complete, thus powering devices plugged into the circuit. In this case, motion of the float 1504 pulls or pushes on the 'light switch' of the circuit, represented here as a button 1510, such that when the float is not elevated by an unusual water level, the circuit is not completed, and when the float 1504 is lifted up by a raised water level 106 as presented in FIG. 15B, the circuit is completed. One notes that mechanisms that open and close a circuit in response to movement of a float don't have to have a separate 'button' or 'switch' element and can be built to fill the same niche several ways, and this extra 'button' element is included mostly for explanatory purposes to make the functionality obvious and apparent. When the circuit is closed, the transmitter 1506 is powered, and thus transmits the alert 208. As, in the simplest embodiment, the alert 208 is the only message the transmitter ever sends (a more complicated embodiment might include a water level measurement more precise than "too high"/"not too high" or an identifying street address), all that would be required is a device that, when powered, continuously blares the alert 208; it is noted that, in a network containing multiple devices such as the septic-monitoring network described herein, transmitters may need to be preset to broadcast different and distinct alert 208 signals, such that the individual devices' signals can be identified. It is noted that the transmitter 1506 does not need to be programmed to selectively broadcast or 'figure out' when to broadcast; the power switch is controlled by the float 1504, and the circuit is powered if and only if the alert 208 should be broadcasting. It is further noted that a time delay feature, such as the process presented in FIG. 10, might be implemented by use of a second switch (not shown) placed in the circuit that includes a timer or counter.

Referring now generally to the Figures and particularly to FIG. 15B, FIG. 15B presents the circuit of FIG. 15A, now in a powered state with the circuit 1500 completed; the fluid level 106 has risen, the float 1504 has been lifted by the concerning fluid level 106, the switch 1510 is closed, and thus the transmitter 1506 is powered and transmitting the alert 208.

Referring now generally to the Figures and particularly to FIG. 16, FIG. 16 is an example of a possible software interface for interacting with the server of FIG. 4 and the database of FIG. 5. One notes that, while graphical user interfaces (GUIs) may not be strictly necessary for interacting with computer hardware and software, these tend to facilitate use for many users. Further, it is noted that the variety of GUI design particulars is limited only by the imagination of the programmer or graphic designer doing the designing, and usually by a commonly-understood set of best practices, and the presented image is only intended as a model and example. FIG. 16 is a diagram of a program window appearing on a display module 302D such as a computer monitor connected to the server 302, providing a software interface for a user such as a human technician responsible for the server 302 to receive and respond to alerts 208 received via the network 300 and manage records 502 of the database 302I.

In FIG. 16, the GUI 1600 includes a table 1602 displaying the record 502 information in labeled data fields 1602A-M. A few of these data are recognizable from the table of FIG. 5. All of this is made-up example data, placed as 'filler text' to illustrate the concepts presented herein. The data as presented here includes a unique identifier 1602A for the device, such that the system can reliably identify each device individually without duplication or overlap; most databases use these in some format as a matter of course. The data field 1602B presents a 'Current Alert Level', i.e. whether the device currently registers an overflow state. The data field 1602C presents a 'Last Alert', i.e. when the device last registered an overflow state; if the device 200 of this record 502 hasn't been 'heard from' at all in a long time, not even a blip, this may indicate that a technician should be dispatched to make sure the device 200 hasn't broken down.

The data field 1602D presents a 'Device Type', i.e. the model or variety of this particular device. Different models may be simpler or more elaborate (i.e. cheaper or fancier), and may differ at least in device embodiments from a simple 'ping' when a high-water level is detected (as illustrated in FIG. 15B) to an ongoing readout of water level, as presented in FIG. 18A-B. An identifying indication of device model may indicate what level of information detail or accuracy can be expected from this particular device 200. The data field 1602E indicates a most recent service date, i.e. when this septic system 100 last received attention from a specialist. The data field 1602F lists or links to connected devices 200; specifically, other instances of the invented device 200 that may be installed on different cleanouts within the same septic system, such as to provide more 'coverage' for a large septic system or multiple data-collection points if a problem should occur. In analyzing a septic system problem, such as the analysis of FIG. 17, a technician or analysis algorithm may take into account whether only one of these three devices in the same septic system is registering an alert, whether it's all three, or which device alerted first (indicating that that device 200 might be closer to the source of the trouble), to more quickly diagnose a problem or predict a location for what needs to be fixed, guiding a dispatched specialist and saving the specialist time and extra effort during a septic backup emergency. The data field 1602G provides the address of the house at which the device 200 is installed. The data field 1602H presents contact information for reaching the homeowner, so the people living in the house and relying on the monitored septic system 100 can be notified as to the health of the septic system 100, and be warned if a problem is detected or if their septic system is due for service. The data field 1602I presents a preferred pumping service, and the data field 1602J presents a preferred plumber. These may be preferences indicated by this particular homeowner as to trusted specialists they know, and whom they prefer to have work on their septic system 100. In the absence of an indicated homeowner preference, the business monitoring the devices 200 might simply select a trusted specialist to call in the event of the septic system needing service, or call in a same specialist who worked on the system previously. The data field 1602K indicates status of certification standards that the monitored septic system must qualify under and provide routine documentation for. As previously mentioned, septic systems are heavily regulated these days at least because the environmental impact of one breaking can be sizeable; right now, a lot of this paperwork, certification, and red tape is a burden on homeowners, pumpers, plumbers, and other specialists, and there's generally no easy way to maintain all of that or to know that one is buying a septic system that is fully up to code. One of the benefits intended by invention of the present invented septic management network, is that the service history and certification status of the septic system 100 attached to each device 200 can be tracked and managed all in one place, providing comprehensive septic system monitoring, insurance, and management, and ensuring that one's septic system 100 'paperwork' gets taken care of properly, with less hassle, and in a timely manner. This simple little example indicates in the data field 1602K that both city building code paperwork for Jackson, Tex. (where the LOCATION data field 1602G says this device 200 is installed) and also state building code paperwork for the state of Texas, has been filed for this septic system 100. One notes that real-world data may be more complicated than this simplified drawing of pretend imaginary data. The similarly-simplified data field 1602L presents the first two entries of a service history log for this septic system 100, which may also include dates/times of received alerts from the device, as well as service reported by a pumper or plumber when completed, in addition to data that might be provided by the homeowner such as when the septic system 100 was originally installed.

However incomplete a history might be, at least at first, this still may be useful in knowing when maintenance or an upgrade might be due; whether a recent alert 208 is being repeated; what service was done on the system 100 most recently, when, and by whom; discerning patterns that may indicate useful information; or helping to sell the house attached to the septic system 100 by providing solid and accessible documentation as to the past and present condition of the septic system 100. As one more data field 1602M to present as part of this example, the data field 1602M contains notes regarding the device 200 or system 100; in this example case, a comment that may be useful to a specialist arriving at the location and trying to find the device 100 that prompted the visit: the cleanout (to which the device is equipped) is located behind the garden shed. This 'notes' field may serve to contain any 'miscellaneous' information deemed useful enough to record but lacking a dedicated data field. It is reiterated that all of this data is hypothetical and made up for purposes of illustration, and that the data fields 1602A-M represented here are only a few generic and obvious examples of useful data fields that might be included in these records, also listed for illustrative purposes. There may be other data fields in addition to or instead of these; any that are suitable for enabling practice of the invented method, or that may be preferred for convenience or additional benefit in addition to the data fields that are necessary, might appear in this context.

In addition, the GUI 1600 includes a plurality of buttons 1604A-G on the right-hand side of the image. In one preferred embodiment, a human user such as a technician may monitor the network and devices, receiving alerts when devices detect high fluid levels and responding to the alerts. This GUI 1600 is designed with this technician in mind, and provides buttons for directing the computer to do tasks such as email a homeowner to set up a nonurgent 'checkup' maintenance visit (button 1604A), such as to check on a device 200 with a low battery or weird blip; send an automated message or place a call to a specialist such as a pumper (button 1604B) or a plumber (1604C) to service this septic system 100; transmitting a whole or partial copy of this record 502 (1604D) to another party such as the homeowner, a city official requiring documentation, or someone looking to buy the house; providing all or some of this record information to a publicly-available database (button 1604E) such as a 'blue book' for septic systems imagined to be possible through this technology; editing record information (button 1604F); or directing the device 200 to power off and back on (1604G) as a potential way of remotely resolving a small problem with the device 200 or getting sure that the device 200 is reporting correctly. All of these buttons are possible examples of buttons that may be useful to a technician in the role of monitoring this network, fielding incoming alerts and responding appropriately, taking care of septic system 100 paperwork as needed, and so on. Additional buttons or options may be preferred in addition to or instead of these, such as to provide additional functions useful to the technician, provide more settings or expanded automation ability, provide easy ways to look up commonly-accessed information or display useful charts, and more.

The technician may respond manually to an alert 208 received by computer, such as by picking up a phone and contacting a specialist or homeowner; the computer may assist the technician, such as by providing the right number to dial, placing the call, or providing an option for the technician to send an automated message by clicking a button; or the technician may choose to automate a response such that the computer performs this response automatically without input from the technician. For instance, a homeowner may wish to be informed anytime their device 200 detects a high water level, even if it's a blip; in this case, sending a notification to the homeowner such as an automated text or email whenever their device 200 registers something, is easily automated. The computer may analyze data, such as whether the alert 208 is repeating and for how long, and advise the technician with 'usual' appropriate actions, such as additional notifications to a homeowner, calling in a pumper if there's a likelihood the system 100 may overflow. A sophisticated embodiment of this computer system may even be fully automated and provide appropriate service with supervision by a technician optional, though one recognizes that there would be a low tolerance for computer errors that take the form of erroneously contacting customers, erroneously dispatching service specialists, and so on, and one would likely want to be very sure of this automation before re-tasking that technician entirely. In addition, the technician may complete paperwork and other certification on behalf of the tracked septic systems; the computer might alert the technician which certifications for which systems are most urgent, precisely what each one requires, and may even fill in some data fields required by the paperwork automatically from record data, if appropriate. The technician's role may be more automated or less so, with the least automated of all being a system that only registers the alert 208, and requires the technician to notice the alert 208 and take actions manually having been thus informed, and the most automated being a system that analyzes and completes necessary tasks, such as responding to alerts and completing paperwork, without any input from a technician, once set up to do so. Where precisely between those two extremes an ideal implementation of this role may fall has yet to be determined in practice.

Referring now generally to the Figures and particularly to FIG. 17, FIG. 17 is an example of an analysis of the urgency of an incoming alert 208 based on available record data. While being able to receive the alert 208 and get a current indication that 'there's a problem' is useful already, the context provided by placing the alert 208 in context by analyzing the alert 208 in view of the corresponding record 502 may yield additional information about how urgent the problem is or what the problem may be. The presented algorithm may be simply a guide for a technician as described above to 'figure out' a little more about a detected problem, but could also easily be practiced by a computer, such that the server 302 receiving the alert 208 may also do some analysis and advise the technician, not only that there's a detected problem, but what else is known about the problem and what a good course of action might be. In a fully-automated embodiment with the server 302 doing the responding without a technician's guidance, this same analysis would direct the server 302's responses. It is noted that this entire process chart is represented in FIG. 13 as the single step 13.10.

In step 17.00, the process starts. In step 17.02, the alert 208 is received; this corresponds to the more detailed steps 13.02, 13.06, and 13.08 of FIG. 13, and in FIG. 17 simply establishes that the process starts with a received alert 208 and goes on to process the same received alert 208.

In step 17.04, the algorithm assesses probable urgency of the problem associated with the received alert 208 by checking the record 502 history for when this device 200 last registered an alert 208; i.e. whether the detected problem might be ongoing. For instance, is this the first alert heard from this device 200 in a while, or has this device 200 been sending continuous alerts 208 for the last twelve hours? The former might indicate that a new problem is just beginning, or even be just a blip; the latter is significantly more likely to be an actual problem, and one that has already had twelve hours to worsen since first detection. Knowing whether this is an isolated alert 208 or the latest in a string of alerts 208 can be useful in deciding when the situation is serious enough to warrant interrupting the homeowner's day (or whether it's just a blip), or in estimating whether to set up an appointment for sometime this week or to send a pumper over immediately. The presented algorithm is modeled as formulating an 'urgency score', with the least urgent being 'it looks like something might be wrong, but there's plenty of time to deal with it' and the most urgent being 'the system is probably overflowing already'. In step 17.06, if the first in a string of alerts 208 was sent a while ago (in the example above, the 'twelve hours' scenario), then in step 17.08 the 'urgency score' for this particular alert is increased; an hours-long string of alerts 208 is assessed as likely to be a more urgent situation than a single blip or an alert 208 that's only been repeating for half an hour.

In step 17.10, the algorithm assesses probable urgency of the problem associated with the received alert 208 by checking whether this is an embodiment of the invented device 200 that reports statistics for the fluid level 106, such as those presented in FIG. 18A-18B. If the device 200 detects, not only that the fluid level 106 is 'too high', but also exactly how high the fluid level 106 is currently and how rapidly the fluid level 106 is increasing over time, this can provide more specific information for assessing how urgently this septic system 100 needs a specialist, and what kind. In step 17.12, if the fluid level reading is very high (as opposed to 'just barely high enough to trigger an alert 208'), the urgency score is increased in step 17.14. Analysis regarding rate of fluid level 106 increase isn't on this process chart, but may also contribute to calculation of an urgency score.

In step 17.16, the algorithm assesses the problem associated with the received alert 208 by checking whether the associated septic system 100 recently received maintenance; this would be in the service history. If a specialist just came over yesterday (for instance), and now something is wrong, whatever the problem is may have been unintentionally introduced by something the specialist did; this is more likely than a coincidence, and in any case, this specialist worked on this septic system 100 very recently and may have observed something important to diagnosing the problem. The algorithm may recommend, in step 17.18, that the recent service provider be contacted. Even consulting the history as to what the service provider did, or what problem they were responding to by providing service, may offer a clue as to the recent condition of the system 100; it's also possible that the earlier problem was misdiagnosed, and therefore now re-emerging, and keeping a service record and analyzing new problems in light of previous ones might allow discerning of that kind of pattern and support specialists in recommending the best solutions to homeowners.

In step 17.20, the algorithm assesses the problem associated with the received alert 208 by checking whether the associated septic system 100 includes other monitored devices 200. If there are two devices 200 in the same septic system 100, and one of the two devices 200 is registering an alert 208 that the other device 200 doesn't detect at all, that might indicate a few things about a detected problem. In step 17.22, the recent alert histories of the two devices 200 are compared. As one easy example of an inference that may be drawn from this comparison, in step 17.24 if both devices 200 are reporting the same flood, in step 17.26 the urgency score is raised. Regardless of whether there are multiple devices or whether the urgency score was raised in view of input from the additional devices 200, when the analysis is complete the result is reported at step 17.28, and the process ends at step 17.30.

It is noted that the four analysis tests performed here—(1.) whether this alert 208 is part of a pattern (steps 17.04-17.08), (2.) whether an exact water level can be determined right now (steps 17.10-17.14), (3.) whether the septic system 100 has recently had service (17.16-17.18), and (4.) whether other devices 200 share the same septic system 100 as the device 200 originating the alert 208 (steps 17.20-17.26)—need not be performed in the order presented and can be considered as interchangeable modules. Additional modules of analysis may easily be added to this. The process shown here is not intended to be a complete or exhaustive analysis algorithm, only to provide a solid example. Further, the durations of time mentioned here (e.g. "the first alert 208 was registered a while ago", but how long is 'a while'? How close together should alerts be to register as a pattern instead of individual blips?) may vary depending on the situation or on figuring out the most sensible intervals in practice; this chart is illustrating a concept, not coding.

Some further possible analyses may include tracking the communication record, such that if a homeowner was notified a while ago and hasn't responded or set up a service appointment, for instance, a second and more urgent notification may be recommended. Another possible analysis not shown here might be one of supporting owners of septic systems 100 in an area experiencing flooding, which may register as an explainable false positive on every installed device 200 in the area. A good analysis algorithm might check the weather first, before recommending that each device in the whole area get a service appointment. Further, a good analysis algorithm might recommend that the homeowners be warned about the flood warning and informed of good practices for septic systems during a flood (such as: don't use the sewage system until the water level of the draining field of the septic system is lower than the water level around the house, don't drink untested well water, conserve water and have extra clean water available, and don't pump the septic system 100 while flooded but it's advised to pump the system right after the flood is over) and the local pumping services may be warned as to which several locations may need to call on their assistance soon. After a serious flood, analysis may recommend that the affected septic systems 100 be checked for damage by a specialist or pumped out to remove silt as a result of flooding, and provide guidance in minimizing damage to the monitored system 100. Further useful analyses, functions, and services to provide in this context are easily extrapolated, and all of this is not an exhaustive discussion of these.

Referring now generally to the Figures and particularly to FIGS. 18A and 18B, FIG. 18A is a data table 1800 presenting made-up example data readings over time from an embodiment of the invented device 200 that measures and reports on fluid level 106, rather than only giving binary-value alerts 208 (i.e. either alert or nothing) for high fluid level 106. Looking at the line graph 1802 corresponding to this data table 1800, it's clear what a 'normal' fluid level looks like, more or less, as opposed to the spike in fluid level of Jan. 23, 2020-Jan. 25, 2020, and how analysis of this data history may allow inferences about quirks or chronic irregularities of a system 100, and may provide perspective on a current detected problem, such as being able to check whether the fluid level 106 has built gradually to a point of triggering an alert 208 (and in that case, when the build-up began, even if this was months ago), or whether the rise in fluid level is sudden and abrupt. Data readings like this may allow an analysis program of the server 302 to build a profile for what 'normal' looks like for this particular system 100, even allowing an AI algorithm, some of which are designed for building just that kind of profile, to diagnose or predict behavior of the system 100 and detect, not just worrisome conditions, like a high fluid level 106 that easily predicts an overflow, but subtler breaks in expected behavior that may hint early at uneven patterns of wear and tear or predict which component is likely to next need replacing.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A septic system fluid level detection device ("the device") comprising:
   a. detection means to detect an atypical fluid level condition within a septic system that warns of a predicted failure of the septic system, the detection means comprising:
      i. a fluid level sensor positioned within a cleanout of a septic system and configured to change from a neutral state to an alert state when a fluid level rising within the cleanout reaches the fluid level sensor; and
      ii. a state indication link adapted to indicate internally within the device a transition of the fluid level sensor from the neutral state to the alert state; and
   b. communication means communicatively coupled with the state indication link and configured to automatically communicate an alert indicating the transition of the fluid level sensor from the neutral state to the alert state via an electronic communications network.

2. The device of claim 1, wherein the device further comprises: a power source electrically coupled with the means to detect movement of the fluid level; and a wireless transmitter electrically coupled with the power source, and the wireless transmitter comprised within the communication means, wherein the wireless transmitter communicates the alert by wireless transmission.

3. The device of claim 2 wherein the power source is a solar panel on a top surface of a cleanout cap of the cleanout.

4. The device of claim 2 wherein the fluid level sensor is a float that hangs downward from a bottom side of the cleanout cap and toward a volume of waste fluid contained within the cleanout, such that when the float is elevated by an increased level of waste fluid, the transition of the fluid level sensor from the neutral state to the alert state is instantiated and detected.

5. The device of claim 2, wherein the power source comprises a replaceable power cell.

6. The device of claim 2, wherein the device further comprises a processor bi-directionally communicatively coupled with the detection means and the communications means, whereby the process operatively directs the communications means to communicate the transition of the fluid level sensor from the neutral state to the alert state via wireless transmitter.

7. The device of claim 6, wherein the processor is programmed to:
   a. receive a fluid level sensor reading from the sensor;
   b. assess the fluid level sensor reading as either typical or atypical;
   c. register an alert condition if the atypical fluid level is detected; and
   d. transmit via the wireless transmitter a signal to a specified monitoring system identifying the device location and indicating the registered alert condition.

8. A septic system information system for monitoring one or more septic systems, the system comprising:
   a. A digitized record of information comprising cleanout fluid level state data of an identified septic system;
   b. Means to associate said digitized record with a location of the identified septic system; and
   c. Means to transmit at least one fluid level state datum of the digitized record of information via an electronic communications system in association with an identifier of the identified septic system or a locale identifier of a location associated with the identified septic system.

9. The system of claim 8, further comprising:
   d. Means to receive a digitized alert message via an electronic communications network, the alert from a cleanout fluid detection device and including information associated with either the identified septic system or with the location association the identified septic system; and
   e. Means to transmit at least a portion of the cleanout fluid level state data of the digitized record of information via an electronic communications media in association with the identifier of the identified septic system or the locale identifier.

10. A method comprising applying the system of claim 9 to perform the aspects of:
   a. a processor receiving the digitized alert message via an electronic communications network, the alert including information associated with either the identified septic system or with the location association of the identified septic system; and
   b. transmitting at least a portion of the cleanout fluid level state data of the digitized record of information via an electronic communications media in association with the identifier of the identified septic system or the locale identifier.

11. The method of claim 10, further comprising assessing of a likely severity or urgency of a detected septic system failure by tracking an interval of time since the associated alert was first received.

12. The method of claim 10, further comprising the processor assessing of a likely severity or urgency of a detected septic system failure by tracking a receipt of a second alert message containing cleanout fluid level state data received from a same source as a first alert message received before, indicating that a same detected problem persists and may be worsening as a result of elapsed time since the first alert message.

13. The method of claim 12, wherein the processor is further programmed to conserve device power by scheduling a delayed frequency pattern of sensor readings.

14. The method of claim 10, further comprising assessing of a likely severity or urgency of a detected septic system failure by tracking of a reported fluid level statistic over time which is associated with a sewage system record.

15. The method of claim 10, further comprising automation of assessment of sewage problem severity based on available cleanout fluid level state data.

16. The system of claim 9, further comprising association of multiple alert message sources with a same septic system record.

17. The system of claim 16, wherein current alert states of a plurality of alert message sources associated with a same septic system record are analyzed collectively to assess a detected septic system problem.

18. The system of claim 9, further comprising automated notification regarding the digitized alert message when received, if the alert is assessed to be urgent.

19. The system of claim 8, further comprising a software interface suitable for enabling a user to perform or automate the following tasks:
   manage septic system records containing cleanout fluid level state data associated with one or more septic systems within a septic system service network; and
   receive, track, and record cleanout fluid level state data associated with managed septic systems.

20. The software interface of claim 19, further enabling a user to perform or automate the task of responding to a septic system alert by notifying one or more septic system specialists to service an associated septic system.

21. The software interface of claim 19, further enabling a user to perform or automate the task of responding to a septic system alert by notifying a homeowner associated with a septic system record associated with the septic system alert.

22. The software interface of claim 19, further enabling a user to perform or automate the task of managing and completing certification procedures regarding septic systems within the septic system service network.

* * * * *